US009841557B2

(12) United States Patent
Johansen et al.

(10) Patent No.: US 9,841,557 B2
(45) Date of Patent: Dec. 12, 2017

(54) MICROSTRUCTURED OPTICAL FIBER, SUPERCONTINUUM LIGHT SOURCE COMPRISING MICROSTRUCTURED OPTICAL FIBER AND USE OF SUCH LIGHT SOURCE

(71) Applicant: NKT PHOTONICS A/S, Birkerød (DK)

(72) Inventors: Jeppe Johansen, København Ø (DK); Ole Bang, Virum (DK); Casper Larsen, Brønshøj (DK); Thomas Feuchter, Holte (DK); Carsten L. Thomsen, Virum (DK); Thomas Vestergaard Andersen, Birkerød (DK)

(73) Assignee: NKT PHOTONICS A/S, Birkerod (DK)

( * ) Notice: Subject to any disclaimer, the term of this patent is extended or adjusted under 35 U.S.C. 154(b) by 0 days.

(21) Appl. No.: 14/903,762

(22) PCT Filed: Jul. 7, 2014

(86) PCT No.: PCT/DK2014/050206
§ 371 (c)(1),
(2) Date: Jan. 8, 2016

(87) PCT Pub. No.: WO2015/003715
PCT Pub. Date: Jan. 15, 2015

(65) Prior Publication Data

US 2016/0170136 A1 Jun. 16, 2016

(30) Foreign Application Priority Data

Jul. 10, 2013 (DK) ................................. 2013 70390

(51) Int. Cl.
*G02B 6/02* (2006.01)
*G02F 1/365* (2006.01)
(Continued)

(52) U.S. Cl.
CPC ..... *G02B 6/02376* (2013.01); *G01B 9/02091* (2013.01); *G02B 6/02214* (2013.01);
(Continued)

(58) Field of Classification Search
None
See application file for complete search history.

(56) References Cited

U.S. PATENT DOCUMENTS 8,977,087 B2 * 3/2015 Jacobsen ............ G02B 6/02376 385/43
2002/0006264 A1 1/2002 Birk et al.
(Continued)

FOREIGN PATENT DOCUMENTS

WO 01/86347 A1 11/2001
WO 2010/060435 A1 6/2010
(Continued)

OTHER PUBLICATIONS

International Search Report (PCT/ISA/210) dated Nov. 7, 2014, by the Danish Patent Office as the International Searching Authority for International Application No. PCT/DK2014/050206.
(Continued)

*Primary Examiner* — Hemang Sanghavi
(74) *Attorney, Agent, or Firm* — Buchanan Ingersoll & Rooney P.C.

(57) ABSTRACT

The invention relates to a microstructured optical fiber for generating incoherent supercontinuum light upon feeding of pump light. The microstructured optical fiber has a first section and a second section. A cross-section through the second section perpendicularly to a longitudinal axis of the fiber has a second relative size of microstructure elements and preferably a second pitch that is smaller than a blue edge pitch for the second relative size of microstructure elements. The invention also relates to an incoherent supercontinuum
(Continued)

10

8 12 13 14

$L_{t1}$ source comprising a microstructured optical fiber according to the invention.

20 Claims, 21 Drawing Sheets

(51) Int. Cl.
*G02F 1/35* (2006.01)
*G01B 9/02* (2006.01)
*G02B 6/255* (2006.01)
*H01S 3/067* (2006.01)
*H01S 3/094* (2006.01)
*H01S 3/11* (2006.01)

(52) U.S. Cl.
CPC ..... *G02B 6/02333* (2013.01); *G02B 6/02347* (2013.01); *G02B 6/02361* (2013.01); *G02B 6/255* (2013.01); *G02F 1/353* (2013.01); *G02F 1/365* (2013.01); *H01S 3/06725* (2013.01); *H01S 3/06729* (2013.01); *H01S 3/094042* (2013.01); *H01S 3/094076* (2013.01); *H01S 3/1106* (2013.01); *G02F 2001/3528* (2013.01); *G02F 2202/32* (2013.01)

(56) References Cited

U.S. PATENT DOCUMENTS

| | | | | |
|---|---|---|---|---|
| 2002/0114574 | A1 | 8/2002 | Chandalia et al. | |
| 2004/0114897 | A1 | 6/2004 | Koshiba et al. | |
| 2006/0159398 | A1 | 7/2006 | Knox et al. | |
| 2006/0198588 | A1 | 9/2006 | Kuksenkov et al. | |
| 2010/0303419 | A1 | 12/2010 | Benjamin et al. | |
| 2011/0116282 | A1 | 5/2011 | Okuno | |
| 2011/0194812 | A1* | 8/2011 | Melin ................ | G02B 6/02333 385/27 |
| 2012/0236314 | A1 | 9/2012 | Fermann et al. | |
| 2013/0182999 | A1 | 7/2013 | Jacobsen et al. | |
| 2014/0204456 | A1 | 7/2014 | Chavez-Pirson et al. | |
| 2016/0156148 | A1 | 6/2016 | Thomsen et al. | |
| 2017/0085051 | A1 | 3/2017 | Thomsen et al. | |

FOREIGN PATENT DOCUMENTS

| | | | |
|---|---|---|---|
| WO | WO 2010/138808 | A1 | 12/2010 |
| WO | 2011/160646 | A1 | 12/2011 |
| WO | WO 2012/028152 | A1 | 3/2012 |
| WO | WO 2012/125391 | A1 | 9/2012 |

OTHER PUBLICATIONS

Written Opinion (PCT/ISA/237) dated Nov. 7, 2014, by the Danish Patent Office as the International Searching Authority for International Application No. PCT/DK2014/050206.
Danish Search Report and Opinion dated Feb. 21, 2014, issued in corresponding Danish Patent Application No. PA 2013 70390. (8 pages).
Dudley, J. M. et al., "Supercontinuum generation in photonic crystal fiber", Reviews of Modern Physics, vol. 78, pp. 1135-1184, Oct.-Dec. 2006.
Kudlinski, A. et al., "Zero-dispersion wavelength decreasing photonic crystal fibers for ultraviolet-extended supercontinuum generation", Optics Express, vol. 14, No. 12, pp. 5715-5722, Jun. 12, 2006.
Kudlinski, A. et al., "Control of pulse-to-pulse fluctuations in visible supercontinuum", Optics Express, vol. 18, No. 26, pp. 27445-27454, Dec. 20, 2010.
Travers, J.C., "Blue extension of optical fibre supercontinuum generation", Journal of Optics, J.Opt. 12, 113001, pp. 1-19, (2010).
Møller, U. et al., "Optimum PCF tapers for blue-enhanced supercontinuum sources", Optical Fiber Technology, 18, pp. 304-314 (2012).
Lu, F. et al., "Low noise wavelength conversion of femtosecond pulses with dispersion micro-managed holey fibers", Optics Express, vol. 13, No. 20, pp. 8172-8178 Aug.-Sep. 2005.
Sørensen, S., Deep-blue supercontinuum light sources based on tapered photonic crystal fibres, PhD Thesis, Technical University of Denmark, 120 pages, Jun. 2013. (available at orbit.dtu.dk).
Travers, J.C., "Extended blue supercontinuum generation in cascaded holey fibers", Optics Letters, vol. 30, No. 23, pp. 3132-3134, Dec. 1, 2005.
Extended European Search Report issued in corresponding European Patent Application No. 14823553-4-1871 / 3019900 PCT/DK2014/050206, dated Jan. 25, 2017 (9 pages)
Peter Falk et al., "Supercontinuum generation in a photonic crystal fiber tapered to normal dispersion for all wavelengths", 17th International Conference on Optical Fibre Sensors; Research Center COM, Technical University of Denmark; May 23, 2005, pp. 318-321.
Cascante-Vindas et al., "White light supercontinuum generation in a Y-shaped microstructured tapered fiber pumped at 1064 nm," Optics Express, 18:14:14535-14540, Jul. 2010.
Chen et al., Picosecond Fiber MOPA Pumped Supercontinuum Source with 39 W Output Power, Optics Express 5426, (Mar. 15, 2010) pp. 1-7, vol. 18, No. 6, Optical Society of America.
Genty et al., Supercontinuum Generation in Large Mode-Area Microstructured Fibers, Optics Express 8625, (Oct. 17, 2005) pp. 1-9, vol. 13, No. 21, Optical Society of America.
Liao et al., "Five-order SRSs and supercontinuum generation from a tapered tellurite microstructured fiber with longitudinally varying dispersion," Optics Express, 19:16:15389-15396, Aug. 2011.
Marandi et al., "Mid-infrared supercontinuum generation in tapered chalcogenide fiber for producing octave-spanning frequency comb around 3 μm," Optics Express, 20:22:24218-24225, Oct. 2012.
Moller et al., Optimization of Tapered Photonic Crystal Fibers for Blue-Enhanced Supecontinuum Generation, Proceedings of Nonlinear Photonics (2012) pp. 1-3, Optical Society of America.
Song et al., Analysis of the Scalability of Single-Mode Near-Infrared Supercontinuum to High Average Power, Journal of Optics, (2013) pp. 1-9, vol. 15, IOP Publishing Ltd.
Xiong et al., Enhanced Visible Continuum Generation from a Microchip 1064nm Laser, Optics Express 6188, (Jun. 26, 2006) pp. 1-6, vol. 14, No. 13, Optical Society of America.
Supplementary European Search Report dated Feb. 27, 2017, by the European Patent Office in corresponding European Patent Application No. 14 82 2529. (2 pages).
Danish Search Report and Examination Report dated Feb. 19, 2014, by the Danish Patent and Trademark Office in Danish Patent Application No. PA 2013 70389. (7 pages).
Notification of Transmittal of the International Search Report (Form PCT/ISA/220 and PCT/ISA/210) and the Written Opinion of the International Searching Authority (From PCT/ISA/237) dated Oct. 14, 2014, by the Danish Patent Office as the International Searching Authority for International Application No. PCT/DK2014/050205. (8 pages).
The extended European Search Report dated Mar. 8, 2017, by the European Patent Office in European Patent Application No. 14822529.5-1556. (8 pages).

* cited by examiner

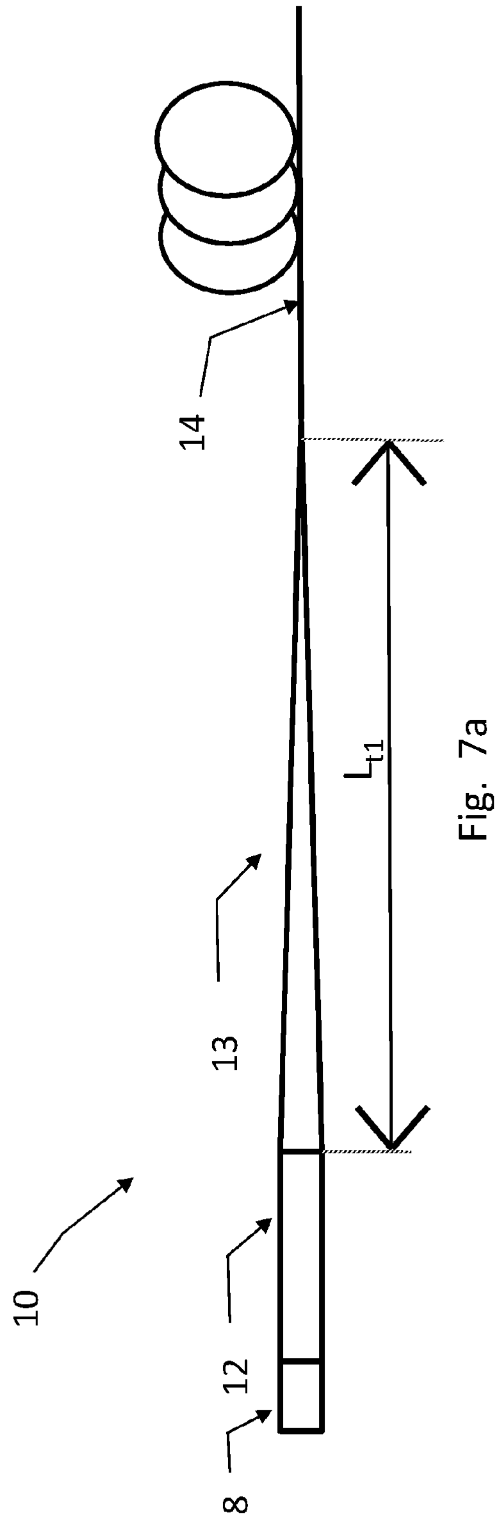
Fig. 7a
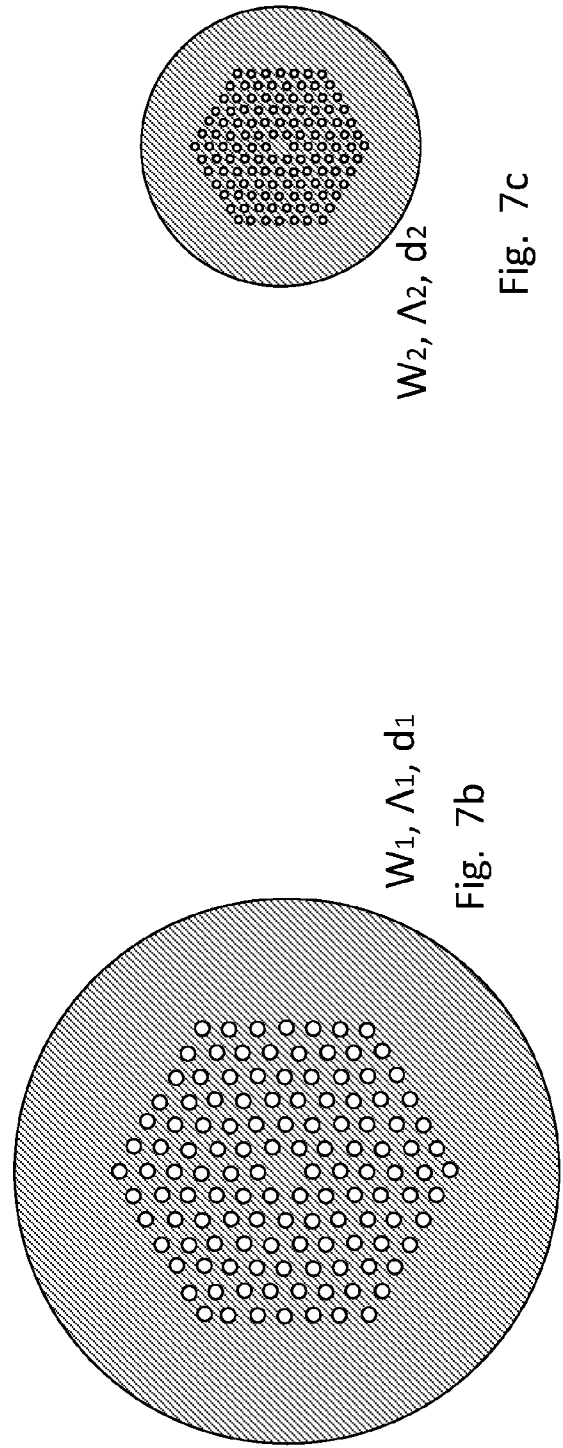
Fig. 7b
Fig. 7c

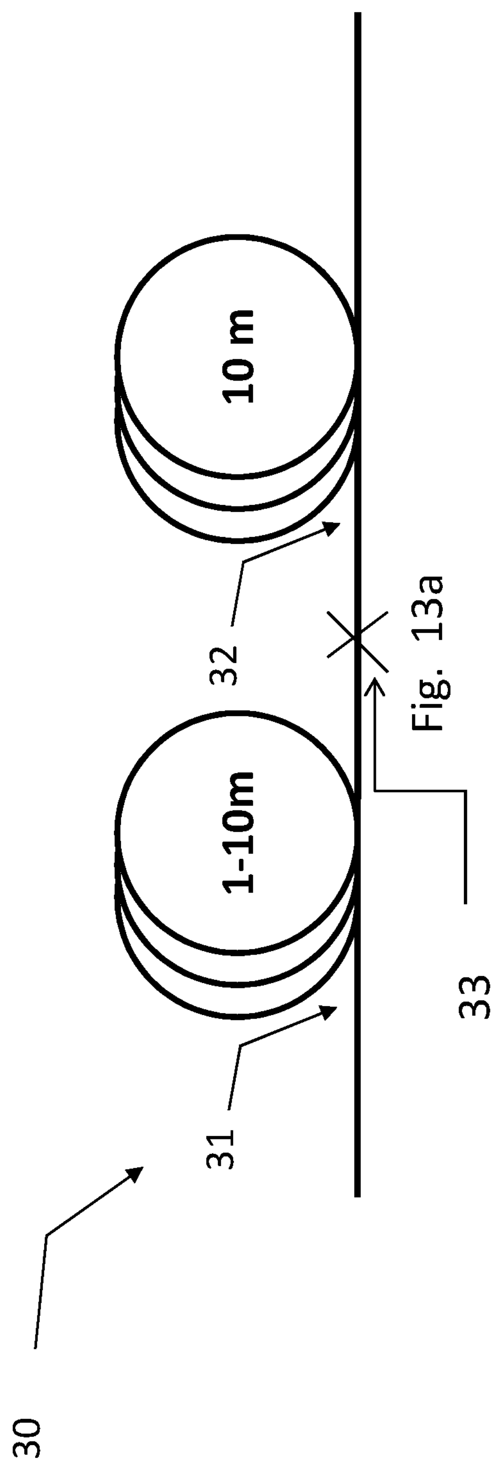
Fig. 13a
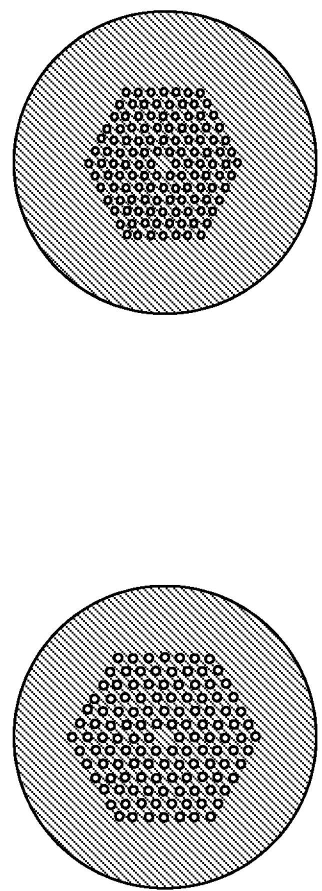
Fig. 13b
Fig. 13c

MICROSTRUCTURED OPTICAL FIBER, SUPERCONTINUUM LIGHT SOURCE COMPRISING MICROSTRUCTURED OPTICAL FIBER AND USE OF SUCH LIGHT SOURCE

TECHNICAL FIELD

The invention relates to a microstructured optical fiber for generating incoherent supercontinuum light upon feeding of pump light. The invention also relates to a supercontinuum light source comprising a microstructured optical fiber and to the use of such light source.

BACKGROUND OF THE INVENTION

In optical fibers, a supercontinuum light is formed when a collection of nonlinear processes act together upon feeding of a pump beam in order to cause spectral broadening of the original pump beam. The result may be a smooth spectral continuum spreading such as over more than an octave of wavelengths. Suitable non-linear processes are for example self-phase and cross-phase modulation, four-wave mixing, Raman gain or soliton based dynamics, interacting together to generate the supercontinuum light. In order to get the broadest continua in an optical fiber, it is most efficient to pump in the anomalous dispersion regime; however a spectral continuum may in some optical fibers be obtainable by pumping in the normal dispersion regime.

Microstructured optical fibers may be designed for supercontinuum generation due to their high non-linearity and their customizable zero dispersion wavelength. Microstructured optical fibers may be formed from a background material, e.g. silica, and comprise a solid core region surrounded by a cladding region, which comprises an array of cladding features, e.g. air filled holes, in a background matrix. The air/background material of the cladding creates an effective refractive index which may be less than the refractive index of the core region and thus permits the guidance of light within the core by a variation of the traditional mechanism of total internal reflection.

The terms "microstructured fibers" and "microstructured optical fibers" are in this context meant to cover optical fibers comprising microstructures such as photonic crystal fibers, photonic bandgap fibers, leaky channel fibers, holey fibers, etc. Unless otherwise noted the refractive index refers to the average refractive index which is usually calculated for the core and each layer surrounding it separately, whether the fiber is a standard fiber, where the core and any cladding layers surrounding that core have a substantially homogeneous refractive index, or a microstructured fiber where the core and/or one or more cladding layers comprise microstructures.

A cladding layer is defined a layer with a thickness and surrounding the core where the refractive index is substantially homogeneous or where the where the layer has a base material with substantially homogeneous refractive index and a plurality of microstructures arranged in a uniform pattern.

The zero dispersion wavelength (ZDW) is an important parameter in the generation of supercontinuum spectra where the widest spectra are produced when the pump wavelength is relatively close to the ZDW. In microstructured fibers, it is well known to shift the ZDW to thereby enable laser sources having different wavelengths to be utilised as pump sources in the generation of supercontinuum spectra.

The microstructured optical fibers will have a U-shaped variation in group index curve as a function of wavelength. The group index at a larger wavelength is matched to the group index at a shorter wavelength. A frequency-shifting soliton propagating in the anomalous-dispersion regime effectively traps blue radiation propagating with the same group index on the other arm of the "U" in a potential well and scatters the blue radiation to shorter wavelengths.

Supercontinuum generation is a complex process, and any quantitative explanation of the underlying physics must take into account a number of different fiber and pulse parameters. Nonetheless it is generally accepted that the most efficient method to obtain a very broad supercontinuum is by using a pump wavelength slightly in the anomalous group-velocity dispersion (GVD) regime of a highly nonlinear Photonic Crystal Fiber (PCF) with only one zero-dispersion wavelength (ZDW) below the absorption limit of the material. In contrast, pumping in the normal GVD regime of a PCF will in general reduce the bandwidth and require a longer length of the PCF (J. Dudley et al, "Supercontinuum generation in photonic crystal fiber", Reviews of Modern Physics, Vol. 78, p. 1135, October-December 2006).

Typically prior art high power supercontinuum sources use a pump wavelength of around 1064 nm and a PCF with a core size of about 3.5 to 5 μm having a ZDW slightly below the pump wavelength. Typical examples of such fibers are the commercial products from SC-5.0-1040 (core size 5.0 μm, ZDW=1040 nm) and SC-3.7-975 (core size 3.7 μm, ZDW=1040 nm) from NKT Photonics. A standard calculation of the dispersion of a PCF with a given core size, shows that the ZDW decreases when the relative hole size increases (defined as hole size divided by pitch). As the core size of the PCF increases, so does the relative hole size that is required to obtain a ZDW of about 1064 nm. For very large relative hole sizes, it is possible to obtain a ZDW at 1064 nm for core sizes up to about 6 μm. Hence in order to have anomalous dispersion at a wavelength of 1064 nm in a PCF, the core size is limited to about 6 μm or less.

In supercontinuum sources it is advantageous to reduce the noise. It is an object of the invention to provide an optical fiber arranged to generate incoherent supercontinuum light with reduced noise.

The article "Zero-dispersion wavelength decreasing photonic crystal fibers for ultraviolet-extended supercontinuum generation" by Kudlinski et al., Optics Express Vol. 14, No. 12, 12 Jun. 2006, describes tapering of fibers in order to extend the generation of supercontinuum spectra from the visible into the ultraviolet. This article describes the manufacturing of tapered microstructured fibers with a regular array of microscopic air holes surrounding a solid silica core. By adjusting the drawing parameters, tapered fibers with a length in the order of 10 m are manufactured with a continuously-decreasing ZDW along their length. The article describes that this decreasing ZDW extends the generation of supercontinuum spectra from the visible into the ultraviolet. The article relates to fibers with large holes, and indicates that the shortest edge of the supercontinuum spectrum is achieved for fibers having a core size at about 2 μm. The article also states that further tapering to smaller core sizes does not provide light at shorter wavelengths, but merely decreases the power.

The article "Control of pulse-to-pulse fluctuations in visible supercontinuum", by A. Kudlinski et al. in "Optics Express, 20 Dec. 2010, Vol. 18, No. 26, examines fluctuations in supercontinuum systems. It is described that millimeter-long post-processed tapers result in a low spectral power density in the visible spectrum, which is detrimental to many applications. Thus, short tapers are unsuitable for incoherent SC sources.

The article thus describes tower tapered fibers. The power spectra and pulse-to-pulse fluctuation spectra of the supercontinuum spectrum are compared for a system with a 15 m uniform PCF and system with a fiber having an 8 m uniform PCF followed by a 7 meter long tapered section. It is seen that the tapered system extends the light into ultra-violet, as described earlier in the previously mentioned paper from Kudlinski, 2006. For the 15 m uniform fiber, it was found that the pulse-to-pulse fluctuations have a nearly stable level from 700 nm to 1400 nm, but that the fluctuations are increased for wavelengths below 700 nm. For the system using the tapered fiber, the pulse-to-pulse fluctuations from 700 nm to 1400 nm are similar to the system with the uniform fiber, whilst the flat level is maintained all the way down to around 400 nm for the system using the tapered fiber.

The review article “Blue extension of optical fibre supercontinuum generation” by J. C. Travers in Journal of Optics, J. Opt. 12(2010), 113001, describes how to design fibers for obtaining the shortest possible blue edge by choosing the dispersion of a fiber, its nonlinear properties and the effective area of the fiber.

It is shown that the low wavelength edge for the supercontinuum is obtained where there is a group velocity match to the wavelength at the infrared loss edge. Furthermore the low wavelength edge is mapped as a function of pitch and relative hole size in the PCF. It is found that the shortest low wavelength edge is obtained for very large relative hole sizes ($d/\Lambda>0.85$) and at pitches around 2.0 μm. Furthermore, the pitch giving the lowest wavelength edge increases as the relative hole size decreases, to e.g. around $\Lambda=2.3$ μm at $d/\Lambda=0.60$.

These conclusions are confirmed in the review paper “Optimum PCF tapers for blue-enhanced supercontinuum sources” by U. Møller et al, Optical Fiber Technology 18, 2012, pages 304-314, wherein it is described that tapering of photonic crystal fibers has proven to be an effective way of blue shifting the dispersive wavelength edge of a supercontinuum spectrum down in the deep-blue. This paper also describes how high-energy solitons reaching the infrared loss edge through trapped and group-velocity matched dispersive waves is an effective way of blue shifting the blue edge of a supercontinuum spectrum.

The paper “Low noise wavelength conversion of femtosecond pulses with dispersion micro-managed holey fibers” by Fei Lu and Wayne H. Knox, Opt. Express, Vol. 13, No. 20, page 8172 (2005), describes how to minimize the noise for coherent supercontinuum sources, pumped with 100 femto-second pulses at 920 nm. The supercontinuum and noise spectra are compared for an 80 cm uniform fiber, a fiber having a 2.6 cm taper and a dispersion micro-managed fiber comprising a taper with length of <1 cm. It is shown that the noise is largest for the uniform fiber, and lowest for the dispersion micro-managed fiber. It is explained that this is due to the short length of the dispersion micro-managed fiber matching the length scale for the soliton fission process while being too short to allow for additional “messy fission collisions” (sic) to take place. It is worth noticing that for coherent sources the supercontinuum spectrum is seeded by the pulse itself by soliton fission processes, whereas for incoherent supercontinuum sources the supercontinuum is seeded from noise, and thus it is not possible to make a dispersion micro managed fiber as taught by Lu and Knox for incoherent supercontinuum sources.

SUMMARY OF THE INVENTION

It is an object of the present invention to provide an optical fiber for generating incoherent supercontinuum light with improved quality and/or reduced noise.

In an embodiment it is an object to provide an optical fiber for generating supercontinuum light with an increased output power compared with present optical fibers, at least in some spectral ranges within the supercontinuum.

In an embodiment it is an object to provide a supercontinuum light source with a decreased noise output compared to present supercontinuum light sources.

The supercontinuum light source of the invention is advantageously suitable for use in an optical measurement system.

In an embodiment of the present invention a microstructured optical fiber for generating incoherent supercontinuum light upon feeding of pump light is provided. The optical fiber has a length and a longitudinal axis along its length, and comprises a core region that is capable of guiding light along the length of the optical fiber. The optical fiber also has a first cladding region surrounding the core region. The first cladding region comprises a microstructure having a plurality of microstructure elements. Along its length, the microstructured optical fiber comprises a first section with a first length $L_1$. At least at a first cross-section through the first section perpendicularly to the longitudinal axis the microstructure elements of the optical fiber has a first pitch $\Lambda_1$, a first microstructure diameter $d_1$ and a first relative size $d_1/\Lambda_1$ of microstructure elements. At least in the first cross-section the microstructured optical fiber has a first zero dispersion wavelength $ZDW\mathbf{1}_1$ in the range from about 920 to about 1120 nm. Along its length, the optical fiber moreover comprises a second section having a second length $L_2$. At least at a second cross-section through the second section perpendicularly to the longitudinal axis the microstructure elements have a second pitch $\Lambda_2$, a second microstructure diameter $d_2$ and a second relative size $d_2/\Lambda_2$ of microstructure elements. The microstructured optical fiber has at least in the second cross-section through the microstructured optical fiber a first zero dispersion wavelength $ZDW\mathbf{2}_1$ and a second zero dispersion wavelength $ZDW\mathbf{2}_2$, where the second zero dispersion wavelength is about 2200 nm or shorter. The sum of the first length $L_1$ and the second length $L_2$ is about 1 meter or larger, such as about 3 meter or larger, such as about 5 meter or larger, such as about 10 meter or larger. The relative size $d_1/\Lambda_1$ of microstructure elements in the first section is about 0.75 or less, such as about 0.65 or less, such as about 0.55 or less.

It has been found that the microstructured optical fiber with the first zero dispersion wavelength $ZDW\mathbf{1}_1$ in the range from about 920 to about 1120 nm and the zero dispersion wavelength about 2200 nm or shorter can be provide an incoherent supercontinuum spectrum with reduced noise over a large range of wavelengths such as wavelength at least about 100 nm higher than the possible blue edge wavelength, for example wavelength in the range from about 600 nm to about 1000 nm, such as about 650 nm to about 950 nm, such as about 680 nm to about 920 nm.

Advantageously, the second pitch $\Lambda_2$ is smaller than a blue edge pitch $\Lambda_{blue}$. The blue edge pitch $\Lambda_{blue}$ is defined as a specific pitch giving the shortest possible blue edge wavelength of the supercontinuum light for the second relative size $d_2/\Lambda_2$ of microstructure elements. The microstructured optical fiber according to an embodiment of the invention having a second section with a second pitch smaller than the blue edge pitch provides, when pumped with a pump source with a center wavelength between about 1000 nm and about 1100 nm, an incoherent supercontinuum spectrum with a very low noise and it has been found that the incoherent supercontinuum spectrum may have reduced noise over a large range of wavelengths, e.g. compared to a uniform fiber having the dimensions of the first section. When the second pitch is smaller than the blue edge pitch $\Lambda_{blue}$, it has been found that the noise is reduced in a spectral region around the group velocity matched wavelength for the second section $GVMW_2$, but not necessarily at very short wavelengths around 400 nm. E.g. it is observed that a group velocity matched wavelength $GVMW_2$ in the range from about 650 nm to 800 nm will provide low noise at least in the spectrum from about 680 nm to about 920 nm.

The phrases “first length section of the fiber” and “second length section of the fiber” are not intended to limit the scope of the claims to situations where light propagates from the first fiber length section towards the second longitudinal position. The microstructured optical fiber also relates to embodiments, wherein light propagates from the second fiber length section towards the first fiber length section.

Moreover, the phrases “first length section of the fiber” and “second length section of the fiber” are not intended to limit the scope of the claims to straight or uniform sections of fiber. In an embodiment the first and second sections of the fibers are uniform sections of fiber, and the pitch, microstructure diameter and relative size of microstructure elements are substantially constant throughout the section. In this case the first section and the second section may be connected via splicing or via tapering. Alternatively, either the first or the second section is uniform whilst the other has varying pitch, microstructure diameter and/or relative size of microstructure elements. In yet an alternative, both the first section and second section have varying size. In this alternative, both sections vary in size, pitch, microstructure diameter and/or relative size of microstructure elements. There may not be a clear distinction between the first and second length sections of the fiber.

The microstructure may comprise different types of microstructure elements, such as elements comprising a material with a refractive index different from the refractive index of the background material, in which the elements are embedded. The microstructure elements may comprise air holes and/or material that are up-doped and/or down-doped relative to the background material, such as a silica material doped with index changing materials such as F, Ge, P, B, or combinations thereof. In the case where the microstructure elements are air holes, the terms “relative size of microstructure elements” and “relative hole size” are synonymous.

The term “relative size microstructure elements” is a measure of the ratio of microstructure elements to base material of the fiber. A relative size of microstructure elements of zero corresponds to no microstructure elements, whilst a relative size of microstructure elements of close to one would indicate that the microstructure takes up most of the optical fiber in the cladding.

Where each microstructure element of the cladding has a microstructure element diameter d and where the microstructure elements are arranged at a pitch $\Lambda$, the relative size of microstructure elements are $d/\Lambda$. It should be noted that the pitch $\Lambda$ is a measure of the spacing between the microstructure elements, e.g. the distance between the centers of two adjacent microstructure elements.

It is generally desired that the microstructure element of the cladding is arranged in rings surrounding the core, where the rings of the microstructure element preferably are in a hexagonal pattern. In an embodiment substantially all the microstructure elements in a given cross-section have similar size. In this context “substantially” is meant to mean at least 90% of the microstructure elements or more, such as 95% of the microstructure elements or more, such as 99% of the microstructure elements. Alternatively, the microstructure elements in a give cross-section have varying size, such as varying microstructure diameter. In this case, the parameters “pitch”, “microstructure diameter” and thus “relative size of microstructure elements” may be taken as an average of the parameters for all the microstructure elements in the cross-section, as an average of the parameters for the two or three rings of microstructure elements closest to the core of the optical fiber, or as the parameters of the row of microstructure elements closest to the core of the optical fiber.

Preferably the microstructure elements of the first cladding region are arranged in a hexagonal pattern forming a number of rings surrounding the core. Optionally the microstructured optical fiber comprises one or more additional cladding regions surrounding the first cladding region wherein the one or more additional cladding regions optionally comprises microstructure elements e.g. arranged in a hexagonal pattern.

The term “zero-dispersion wavelength” is taken to mean a wavelength where the dispersion of the optical fiber changes from negative to positive or from positive to negative when comparing two wavelengths close to the zero dispersion wavelength ZDW, such as within 10 nm of the ZDW, such as within 5 nm of the ZDW, such as within 1 nm of the ZDW, such as within 0.5 nm, such as within 0.1 nm, such as within 0.01 nm.

It is customary in the literature to call the dispersion normal when it is negative and anomalous when it is positive; this terminology is adopted here.

The above identified article by J. C. Travers discusses the effect of “soliton trapping”. In section 2.5 of the article, it is stated: “ . . . , the expansion of the supercontinuum to shorter wavelengths in the normal dispersion region [ . . . ] is limited by the fibre dispersion and pump wavelength. Further expansion requires a different mechanism. Over the last few years the dominant process for such expansion has become known as soliton trapping of dispersive waves [ . . . ]. This process begins when a suitably intense soliton temporally overlaps with a dispersive wave with the same group velocity, but in the normal dispersion region. In this case, intrapulse four-wave mixing [ . . . ] can cause the dispersive wave to slightly blueshift and the soliton to slightly redshift. But note that there is no net energy transfer between the two. With normal dispersion a blueshift leads to a deceleration for the dispersive wave, and so it slows with respect to the soliton. The soliton, however, will also redshift due to the Raman-soliton self-frequency shift, and as it is in the anomalous region it will also decelerate. Eventually, it will decelerate enough to overlap again with the dispersive wave, and the process will repeat. It will eventually be limited, usually by a second zero-dispersion wavelength, preventing the soliton from further deceleration or simply extremely high losses on the long wavelength edge preventing further soliton redshift.” Thus, as solitons shift to longer wavelengths, the coupled dispersive wave is shifted to shorter wavelengths as dictated by the group velocity matching condition.

In the context of the present invention, the phrase “supercontinuum” refers to a spectrally broad signal. The supercontinuum is said to have a “blue edge” defining the lower boundary of the spectrum and a “red edge” defining the upper boundary of the spectrum. In a silica optical fiber, the blue edge may be at a wavelength in the range of 300 nm to 600 nm, and the red edge may be at a wavelength in the range of 1300 nm to 2400 nm, such as in the range of 1600 nm to 2400 nm. The spectral width of the supercontinuum is usually defined as the difference between the wavelength of the red and blue edges. Where the second zero dispersion wavelength is larger than about 2400 nm, the second zero dispersion wavelength does not have influence on the blue edge, in that redshifting of solitons is limited by losses in the fiber, preventing further soliton redshift.

It is well-known that the microstructures of a PCF manipulates the properties of light passing through the fiber and provides a tremendous degree of design freedom, i.a. moving the ZDW of the fiber into the visible spectrum. FIG. 1 corresponds to FIG. 2*b* of "Optimum PCF tapers for blue-enhanced supercontinuum sources" by U. Møller et al, Optical Fiber Technology 18, 2012, pages 304-314, and shows dispersion profiles of three fibers having different pitch, but constant relative size of microstructure elements, viz. hole-to-pitch ratio of $d/\Lambda=0.52$. The fiber is a commercially available fiber (SC-5.0-1040, NKT Photonics A/S). The inset in FIG. 1 is a microscope image of the fiber cross-section. From FIG. 1 it may be seen that the fiber having pitch 3.3 μm has a first zero dispersion wavelength of about 1050 nm, the fiber having a pitch of 2.5 μm has a first zero dispersion wavelength of about 1000 nm and the fiber having a pitch of 3.3 μm has a zero dispersion wavelength below 900 nm. The two fibers having pitch 3.3 μm and 2.5 μm do not have a second zero dispersion wavelength below 2400 nm; however, the fiber having pitch 1.7 μm has a second zero dispersion wavelength of about 1800 nm.

The blue edge pitch $\Lambda_{blue}$ can be determined by experiments or it may be calculated e.g. as described by Simon Toft Soerensen in "Deep-blue supercontinuum light sources based on tapered photonic crystal fibers, PhD Thesis, Technical University of Denmark, June 2013. Calculations of the blue edge wavelength for a given pitch and relative size $d/\Lambda$ of microstructure elements, viz. hole-to-pitch ratio, is also described in the review article "Blue extension of optical fiber supercontinuum generation" by J. C. Travers, J. Opt. 12 (2010). In the review article by J. C. Travers the blue edge is defined as the shortest group-velocity matched wavelength. J. C. Travers found that the optimum pitch for large hole-to-pitch ratios was about 2 μm almost independently of the hole-to-pitch ratio.

FIG. 2 corresponds to FIG. 5 of "Optimum PCF tapers for blue-enhanced supercontinuum sources" by U. Møller et al, Optical Fiber Technology 18, 2012, pages 304-314, and shows the blue edge wavelength $\lambda_{blue}$ as a function of pitch $\Lambda$ assuming group-velocity matching to a loss edge of 2300 nm or 2400 nm. The difference in the maximum blueshift of dispersive waves from a soliton reaching 2400 nm and a soliton reaching 2300 nm is illustrated for a fixed hole-to-pitch ratio of 0.52. It may be seen from FIG. 2 that for group-velocity matching to a loss edge of 2300 nm, the minimum blue edge wavelength is about 465 nm, obtainable at a pitch of about 2.6 μm. FIG. 2 also shows that for group-velocity matching to a loss edge of 2400 nm, the minimum blue edge wavelength is about 475 nm, obtainable at a pitch of about 2.5 μm. If the pitch of the fiber is reduced from the pitch given the smallest blue edge wavelength $\lambda_{blue}$, the blue edge wavelength $\lambda_{blue}$ is increased.

The review article "Blue extension of optical fiber supercontinuum generation" by J. C. Travers, J. Opt. 12 (2010) describes the relation between the shortest group velocity matched wavelength as a function of the pitch $\Lambda$ and the relative hole size, viz. the hole diameter to pitch ratio, $d/\Lambda$. It is shown that a pitch $\Lambda$ of around 2 μm gives the shortest matched wavelength almost independently of $d/\Lambda$. Moreover, the larger the pitch ratio $d/\Lambda$, the shorter the group velocity matched wavelength becomes. See for example FIG. 17 of the review article by Travers.

As mentioned above, the article "Control of pulse-to-pulse fluctuations in visible supercontinuum", by A. Kudlinski et al. in "Optics Express, 20 Dec. 2010, Vol. 18, No. 26 relates to tapering of fibers in order to move the noise to lower wavelengths of the spectrum. FIG. 3 is a copy of FIG. 3 of this article by Kudlinski, and shows power and noise as a function of the wavelength of a supercontinuum spectrum obtained from a microstructured optical fiber tapered down (shown in the lower figure by squares) in order to move the noise as compared to a uniform fiber (shown in the lower figure by circles). The noise spectra and the power spectra show that for a uniform fiber, the blue edge of the spectrum is at about 500 nm, and that the noise is substantially higher for the uniform fiber at wavelengths between 500 nm and 700 nm. However, for wavelengths between about 700 nm and about 1500 nm, the noise is substantially equal for the tapered and the uniform fiber. Thus, Kudlinski does not teach how to lower the noise for a large part of the supercontinuum spectrum, only for the wavelength range between about 500 nm and 700 nm.

The inventors have realized that providing the microstructured optical fiber such that the second cross-section has a pitch that is smaller than the blue edge pitch $\Lambda_{blue}$ and such that the relative size $d_1/\Lambda_1$ of microstructure elements in the first cross-section is 0.75 or less actually reduces the noise over a large wavelength range instead of just moving the noise to smaller wavelengths.

In an embodiment, the second zero dispersion wavelength $ZDW\mathbf{2}_2$ in the second cross-section of the microstructured optical fiber is less than up to about 2000 nm, such as less than up to about 1800 nm, such as less than up to about 1600 nm, such as less than up to about 1400 nm, such as less than up to about 1200 nm.

The design of a fiber in order to achieve such a second zero dispersion wavelength is well-known, as described by U. Møller and J. C. Travers, and may be achieved by down-tapering, choice of pitch, etc. Having the second zero dispersion wavelength $ZDW_2$ at about 2200 nm or less i.e. well below 2400 nm means that the second zero dispersion wavelength, as opposed to the loss edge wavelength, limits the redshifting solitons, which then again limits the blueshift of the group-velocity matched dispersive waves.

In an embodiment, the microstructured optical fiber in the second section has a group velocity matched wavelength $GVMW_2$ corresponding to the second zero dispersion wavelength $ZDW\mathbf{2}_2$, where the group velocity match wavelength $GWMW_2$ is a wavelength shorter than the second zero dispersion wavelength $ZDW\mathbf{2}_2$ having a group index corresponding to the group index of the light at the zero dispersion wavelength $ZDW\mathbf{2}_2$, and wherein the group velocity matched wavelength $GVMW_2$ is in the range from about 650 nm to about 800 nm. A group velocity matched wavelength $GVMW_2$ in the range from about 650 nm to 800 nm will provide low noise at least in the spectrum from about 680 nm to about 920 nm.

These absolute values of the group velocity matched wavelengths are only examples. In general, if a supercontinuum spectrum having low noise in a specific wavelength range from X to Y is desirable, the optical fiber of the supercontinuum source should be designed so that the group velocity matched wavelength corresponding to the second zero dispersion wavelength lies in the range between X or a wavelength that is slightly smaller than X and a wavelength of about (X+Y)/2, viz. around the wavelength in the middle of the interval from X to Y.

In an embodiment, the second length $L_2$ of the optical fiber is larger than about 1 m, such as larger than about 3 m, such as larger than about 5 m, such as larger than about 10 m. However, it has been shown that the second length $L_2$ in the case of a tapered fiber may be quite short, such as about 0.5 m or even down to about 20 or 10 cm.

In an embodiment, the sum of the first and second lengths of the microstructured fiber is about 50 m or shorter, such as about 30 m or shorter, such as about 20 m or shorter, such as about 10 m or shorter. These examples of the sum of the first and second lengths of the microstructured fiber all provide a broad supercontinuum light, when pump light in the range between about 1000 nm and about 1100 nm is fed into the fiber.

In an embodiment, the second relative size $d_2/\Lambda_2$ of the microstructure elements of the microstructured optical fiber is about 0.75 or less, such as about 0.65 or less, such as about 0.55 or less, such as about 0.5 or less, such as about 0.4 or less. In this embodiment, the second relative size $d_2/\Lambda_2$ of the microstructure elements, in the second section of the fiber, is similar to or less than the first relative size $d_1/\Lambda_1$ of the microstructure elements in the first section of the fiber.

In an embodiment, the second relative size $d_2/\Lambda_2$ of the microstructure elements in the second section of the microstructured optical fiber is smaller than first relative size $d_1/\Lambda_1$ of the microstructure elements in the first section of the microstructured optical fiber. This is particularly relevant for optical fibers, where the first and second sections are spliced together. In this case a smaller relative size of microstructure elements in the second section combined with an only somewhat smaller absolute decrease in pitch in the second section compared to the first section has turned out to give good results in the form of small splicing losses.

In an embodiment, the second relative size $d_2/\Lambda_2$ of the microstructure elements in the second section of the microstructured optical fiber is substantially equal to the first relative size $d_1/\Lambda_1$ of the microstructure elements in the first section of the microstructured optical fiber. When the first and second sections of the fiber are connected via a tapered section, it is possible to choose whether to keep the relative size of microstructure elements constant throughout the fiber sections or whether to vary the relative size throughout the fiber sections. Such tapers with relative size of microstructure elements constant are inter alia described in the international patent application WO2012028152.

In an embodiment, the first pitch $\Lambda_1$ is about 1.9 μm or larger, such as about 2.2 μm or larger, such as about 2.5 μm or larger, such as about 2.8 μm or larger, such as about 3.1 μm or larger, such as about 3.4 μm or larger, such as about 3.7 μm or larger.

In an embodiment the second pitch $\Lambda_2$ of the microstructured optical fiber is about 0.9 times the blue edge pitch $\Lambda_{blue}$ or smaller, such as about 0.8 times the blue edge pitch $\Lambda_{blue}$ or smaller, such as about 0.7 times the blue edge pitch $\Lambda_{blue}$ or smaller, about 0.6 times the blue edge pitch $\Lambda_{blue}$ or smaller. These small values of the second pitch provide a fiber that is able to generate a supercontinuum spectrum with low noise in a large part of the visible spectrum.

In an embodiment, the microstructured optical fiber further comprises a first tapered section with length $L_{t1}$, wherein the tapered section connects the first section and the second section. In an embodiment, the first and second sections are substantially straight sections of fiber, where the fiber parameters in the first section are uniform, and the fiber parameters in the second section are uniform, whilst at least one or more of the fiber parameters differ between the first and second section. The term "fiber parameters" are meant to cover the pitch, the relative size of microstructure elements, the second zero dispersion wavelength. The tapered section has varying fiber parameters throughout at least a part of the section and connects the first and second sections. The international patent application WO2012028152 mentioned above describes how to provide a microstructured optical fiber with one or more tapered sections. A microstructured optical fiber with a first and second section connected via a tapered section may be manufactured as one fiber in a drawing tower. Thus, a fiber with varying fiber parameters may be obtained without splicing, and thus without occurrence of splicing losses.

In an embodiment, the first zero dispersion wavelength $ZDW\mathbf{2}_1$ of the second section of the optical fiber is less than about 1000 nm, such as less than about 900 nm. For efficient visible supercontinuum generation it is of great importance that the pump wavelength is close to the first zero dispersion wavelength. When the first zero dispersion wavelength is less than about 1000 nm, a commercially available laser source, e.g. ytterbium (1064 nm), may be used as a pump source for generating supercontinuum generation.

In an embodiment, wherein the length of the tapered section $L_{t1}$ is about 0.1 m or larger, such as about 0.2 m or larger, such as about 0.5 m or larger, such as about 1 m or larger, such as about 1.5 m or larger, such as 2 m or larger, such as 5 m or larger, such as 10 m or larger. It is advantageous to manufacture the optical fiber in a drawing tower. In a drawing tower these lengths of tapered section may be provided.

In the case where the microstructured optical fiber comprises a tapered section connecting the first and the second section, the first length $L_1$ is less than 0.5 m, such as less than 0.4 m, such as less than 0.3 m, such as less than 0.2 m, such as less than about 0.1 m. It has turned out that these lengths of a first section in an optical fiber having a tapered section provide a reduced noise compared to a uniform fiber having the dimensions of the first section.

In an embodiment, the second pitch $\Lambda_2$ is smaller than the first pitch $\Lambda_1$. As an example the relative size of the microstructure elements are the same in the first and the second section of the fiber, whilst the second pitch $\Lambda_2$ is smaller than the first pitch $\Lambda_1$. This may be obtained in during manufacture of the optical fiber in a drawing tower.

In an embodiment the second pitch $\Lambda_2$ of the second section is in the range from about 1.1 μm to about 1.7 μm, such as in the range from about 1.3 μm to about 1.5 μm. This range of pitches combined with an indication of the relative size of the microstructure elements corresponds to a given range of group velocity matched wavelengths corresponding to the second zero dispersion wavelength as shown in FIG. 5. This range is particularly relevant for a fiber having a second relative size of microstructure element of about 0.52. A given value of a group velocity matched wavelength corresponds to a given range of wavelengths in the incoherent supercontinuum spectrum obtainable by the optical fiber, where the noise in the given range is reduced.

In an embodiment, the microstructured optical fiber further comprises a second tapered section $L_{1e}$ and a third section with third length $L_3$, a third pitch $\Lambda_3$, a third microstructure diameter $d_3$ and a third relative size $d_3/\Lambda_3$ of microstructure elements. The third pitch $\Lambda_3$ is larger than the second pitch $\Lambda_2$. In an embodiment, the fiber thus contains the first length section, a first tapered section, a second length section, a second tapered section, and a third length section. When the second length section has reduced dimensions in the form of reduced size of the core, reduced size of the cladding and/or reduced outer dimensions, it is advantageous to have a second tapering section and a third length section with larger dimensions than the second length section, in order to handle and/or connect the fiber to further equipment or another fiber.

In an embodiment, a cross-section through the first tapered section perpendicularly to the longitudinal axis of the fiber comprises microstructures at a first tapered pitch $\Lambda_{t1}$, a first tapered microstructure diameter $d_{t1}$ and a first tapered relative size $d_{t1}/\Lambda_{t1}$ of microstructure elements, wherein the first tapered section of the optical fiber has a taper group velocity matched wavelength $GVMW_{t1}$ corresponding to a second zero dispersion wavelength $ZDW_{t1}$ in the cross-section, where the taper group velocity matched wavelength $GVMW_{t1}$ is in the range from about 400 nm to about 500 nm for any cross-section of the first tapered section. When the group velocity matched wavelength stays within the range from about 400 nm to about 500 nm for all cross-sections through the first tapered section, it is possible to obtain a supercontinuum spectrum having a power of at least 2 mW per nm at most wavelengths in the visible spectrum, down to at least about 400-430 nm. In a microstructured optical fiber wherein the second section is tapered, the above range for the group velocity matched wavelength may be relevant for any part of the second section.

In an embodiment, the first relative size $d_1/\Lambda_1$ of microstructure elements is about 0.55 or larger, such as about 0.65 or larger, such as about 0.75. These dimensions of the first relative size of microstructure elements are in particular advantageous when the microstructured optical fiber comprises a tapered section.

In an embodiment, the first section of the microstructured optical fiber is coupled to the second section by a splicing. This is an alternative to tapering the fiber from the dimensions of the first section to the dimensions of the second section, or vice versa. In the context of the present invention, such a fiber, where a first and second section with differing dimensions are spliced together, is denoted “a cascaded fiber”. In an embodiment the first section of the microstructured optical fiber is coupled to the second section by a splicing while one or both of the first section second section comprises a tapered section or sub-section.

In an embodiment of the microstructured optical fiber, the first zero dispersion wavelength $ZDW\mathbf{2}_1$ of the second section is less than about 1100 nm. For example it is about 1060 nm.

In an embodiment, the first relative size $d_1/\Lambda_1$ of the microstructure elements is larger than the second relative size of the microstructure elements $d_2/\Lambda_2$, such as about 1.2 times the second relative size $d_2/\Lambda_2$ of the microstructure elements or larger, such as about 1.3 times the second relative size $d_2/\Lambda_2$ of the microstructure elements or larger, such as about 1.4 times the second relative size $d_2/\Lambda_2$ of the microstructure elements or larger, such as about 1.5 times the second relative size $d_2/\Lambda_2$ of the microstructure elements. In an embodiment where the microstructured optical fiber is a spliced fiber comprising a first section, e.g. a first uniform section with substantially constant dimensions, and a second section, e.g. a second uniform section with substantially constant dimensions, where the outer dimensions of the second section are smaller than those of the first section, it is advantageous that the second relative size of microstructure elements is larger than the first relative size of microstructure elements due to reduced splicing losses. When the second relative size of microstructure elements is larger than the first relative size of microstructure elements, the area of the core in the second section is also larger than it would have been if the relative size of the microstructure elements was similar in the first and second section of the fiber. This provides a larger mode field diameter of the light in the second section compared to the mode filed diameter in the case where the relative size of microstructure elements was similar in the first and second section. This leads to a reduction in splicing loss between the first and second section, compared to the situation where the relative size of microstructure elements was similar in the first and second section.

In an embodiment, the second pitch $\Lambda_2$ is at about 2 μm or larger, such as at about 2.3 μm or larger, such as at about 2.6 μm or larger, such as at about 3 μm or larger. These pitch values provide a relatively large mode field diameter within the fiber in particular where the second pitch is smaller than the blue edge pitch $\Lambda_{blue}$. Therefore, splicing losses between the first and second section are reduced compared to a second section with a smaller second pitch.

In an embodiment, the first length $L_1$ of the optical fiber is in the range from about 1 m to about 5 m or less, such as in the range from about 2 m to about 4 m. In the case where the microstructured optical fiber is a cascaded fiber, where the first and second sections are spliced together, $L_1$ is advantageously between about 2 meter and about 4 meter.

As mentioned above, the invention also relates to an incoherent supercontinuum source comprising a microstructured optical fiber for generating incoherent supercontinuum light upon feeding of pump light. The microstructured optical fiber has a length and a longitudinal axis along its length. Moreover, the microstructured optical fiber comprises, along its length, a core region that is capable of guiding light along the length of the microstructured optical fiber, and a first cladding region surrounding the core region. The first cladding region comprising a microstructure has a plurality of microstructure elements. The incoherent supercontinuum source further comprises a pump source with a center wavelength between about 1000 nm and about 1100 nm and a pulse length of longer than about 500 fs.

Along its length the microstructured optical fiber comprises a first section with a first length $L_1$. At least at a first cross-section through the first section perpendicularly to the longitudinal axis the microstructure elements of the optical fiber has a first pitch $\Lambda_1$, a first microstructure diameter $d_1$ and a first relative size $d_1/\Lambda_1$ of microstructure elements. The microstructured optical fiber has at least in the first cross-section a first zero dispersion wavelength $ZDW\mathbf{1}_1$ in the range from about 920 to about 1120 nm.

The microstructured optical fiber further comprises a second section with a second length $L_2$. At least at a second cross-section through the second section perpendicularly to the longitudinal axis the microstructure elements of the optical fiber has a second pitch $\Lambda_2$, a second microstructure diameter $d_2$ and a second relative size $d_2/\Lambda_2$ of microstructure elements. The microstructured optical fiber at least in the second cross-section through the microstructured optical fiber has a first zero dispersion wavelength $ZDW\mathbf{2}_1$ and a second zero dispersion wavelength $ZDW\mathbf{2}_2$, where the second zero dispersion wavelength is about 2400 nm or shorter. The sum of the first length $L_1$ and the second length $L_2$ is about 1 meter or larger, such as 3 meter or larger, such as 5 meter or larger, such as 10 meter or larger. The relative size $d_1/\Lambda_1$ of microstructure elements in the first cross-section is about 0.75 or less, such as 0.6 or less, such as 0.55 or less.

Preferably the second pitch $\Lambda_2$ is smaller than a blue edge pitch $\Lambda_{blue}$, wherein the blue edge pitch $\Lambda_{blue}$ is defined as a specific pitch giving the shortest possible blue edge wavelength of the supercontinuum light for the second relative size $d_2/\Lambda_2$ of microstructure elements.

Advantageously the optical fiber of the incoherent supercontinuum light source is as described in one or more of the above embodiments.

In an embodiment the pulse duration Δt of the pump light source is more than about 1 ps, such as more than about 5 ps, such as more than about 10 ps, such as more than about 50 ps, such as more than about 100 ps, such as more than about 500 ps, such as more than about 1 ns, such as more than about 2 ns, such as more than about 5 ns, such as more than about 10 ns, such as more than about 50 ns, such as more than about 1 ms. The output pulse length is controllable by controlling the pump characteristics, i.a. the pump pulse length.

In an embodiment the pulse duration Δt of the pump light source is less than about 1 ms, such as less than about 50 ns, such as less than about 10 ns, such as less than about 5 ns, such as less than about 2 ns, such as less than about 1 ns, such as less than about 500 ps, such as less than about 100 ps, such as less than about 50 ps, such as less than about 10 ps, such as less than about 5 ps, such as less than about 1 ps. It is well-known to the skilled person that the output pulse length of a supercontinuum light source is controllable by controlling the characteristics of the light fed into the optical fiber, i.e. by controlling the pump pulse characteristics.

In an embodiment the pump light source comprises a mode-locked laser and at least one amplifier, and the supercontinuum light source has an output spliced onto the input end of the optical fiber. In this embodiment, the connection feeding light from the pump light source to the optical fiber does not comprise any free space couplings. Advantageously the number of splicings and/or intermediate fibers is reduced, which makes it possible to produce the optical fiber faster compared to an optical fiber with more splicings. This embodiment is in particular suitable for systems with picosecond pulses having one or more amplifier.

In an embodiment, the pump source of the incoherent supercontinuum source is a seed laser arranged to provide seed pulses with a seed pulse frequency $F_{seed}$. The supercontinuum source further comprises a pulse frequency multiplier (PFM) arranged to multiply the seed pulses and convert the seed pulse frequency $F_{seed}$ to pump pulses with a pump pulse frequency $F_{pump}$, where the pump pulse frequency $F_{pump}$ is larger than the seed pulse frequency $F_{seed}$. The pulse frequency multiplier is advantageous in that it provides an increase in average optical power relative to the configuration where the pulse frequency multiplier is omitted because the repetition rate of the pump pulses is increased while the peak power and pulse duration is substantially constant.

In an embodiment, the supercontinuum light source is used for at least one of the following applications: photoacoustic measurements, multi-spectral imaging, LIDAR (Light Detection and Ranging), STED (Stimulated Emission Depletion), flururesecence lifetime imaging (FLIM) or optical coherence tomography (OCT).

The supercontinuum light source has shown to be surprisingly suitable for use in optical coherence tomography (OCT). This is due to the high stability and very low noise over a broad spectral range. In an embodiment the supercontinuum light source is used in spectral domain OCT.

The invention also relates to an optical coherence tomography (OCT) acquisition system comprising a supercontinuum light source as described above and a detector for collecting reflected light and an image processor for analyzing the detected reflected light.

The OTC acquisition system advantageously comprises one or more spectral filters for selecting a suitable spectral part of a light pulse to be applied in a given analysis. In an embodiment the selected bandwidth of the acquisition system is such as more than 100 nm, such as more than 200 nm, such as more than 300 nm, such as more than 400 nm or such as more than 500 nm. In an embodiment the central wavelength of the acquisition system is such as between 750 and 850 nm, such as between 1000 and 1100 nm, or such as between 1200 and 1400 nm.

In an embodiment the acquisition system is configured to determine a wavefront aberration in a coherent signal to thereby provide a wavefront sensor. Thereby the OTC acquisition system is in particular suitable for use in laser eye surgery in particular for ensuring reduced risk of damage to the retina and optic nerve.

The invention also comprises a method of performing laser eye surgery of an eye comprising a cornea using the OTC acquisition system described above. Advantageously the laser eye surgery is LASIK (Laser Assisted in situ Keratomileusis). A LASIK surgery is usually performed by an ophthalmologist who uses a laser to reshape the eye's cornea in order to improve visual acuity.

The method of the invention comprises providing a topographic map of the cornea using an optical coherence tomography (OCT) acquisition system as described above and applying the topographic map for determining the amount and the location of corneal tissue to be removed. The method advantageously comprises cutting through the corneal epithelium and Bowman's layer of the eye and creating a flap using a laser e.g. comprising a supercontinuum source as described above. The laser may e.g. be applied to create a series of tiny closely arranged bubbles within the cornea while leaving a hinge at one end of this flap. The flap is folded back, revealing the stroma (the middle section of the cornea).

The second step of the procedure uses advantageously an excimer laser (e.g. about 193 nm) or another UV laser to remodel the corneal stroma. The laser vaporizes the tissue in a finely controlled manner without damaging the adjacent stroma. The excimer laser advantageously uses an eye tracking system based on the topographic map or tracked by the OTC acquisition system arranged to follow the patient's eye position during the surgery e.g. several hundred or thousands time per second and which is redirecting laser pulses for precise placement within the treatment zone. Typical pulses are around 1 milijoule (mJ) of pulse energy in 10 to 20 nanoseconds.

After the laser has reshaped the stromal layer, the LASIK flap is carefully repositioned over the treatment area by the surgeon and checked for the presence of air bubbles, debris, and proper fit on the eye. The flap remains in position by natural adhesion until healing is completed.

BRIEF DESCRIPTION OF DRAWINGS

The invention will be explained in more detail below in connection with embodiments and with reference to the drawings in which:

FIG. 7*a* shows a schematic drawing of an embodiment of a microstructured optical fiber according to the invention;

FIGS. 7*b* and 7*c* show cross-sections of a microstructured optical fiber, perpendicular to the longitudinal axis, at a first and second fiber length section, respectively;

FIGS. 13*a*, 13*b* and 13*c* show a cascaded optical fiber according to an embodiment of the invention and cross-sections through a first and second section thereof.

The figures are schematic and are simplified for clarity. Throughout the description, the same reference numerals are used for identical or corresponding parts.

Figure 1:
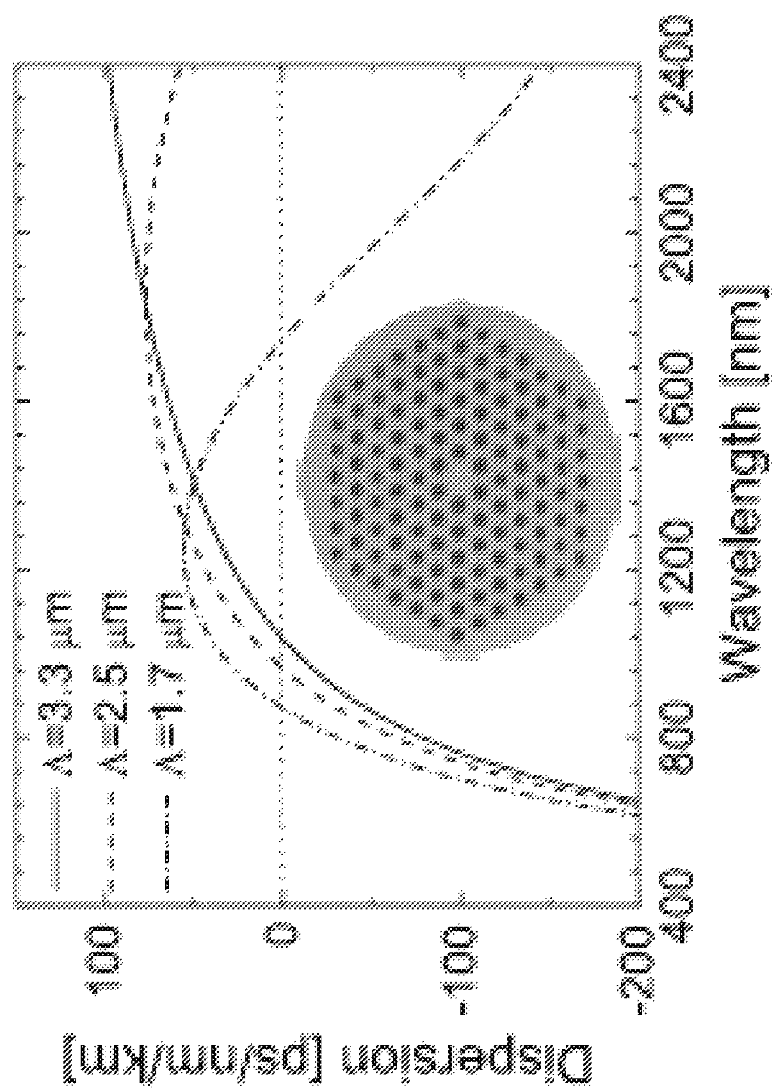
FIG. 1 shows dispersion profiles of three fibers having different pitch, but constant hole-to-pitch ratio of $d/\Lambda=0.52$.
Figure 2:
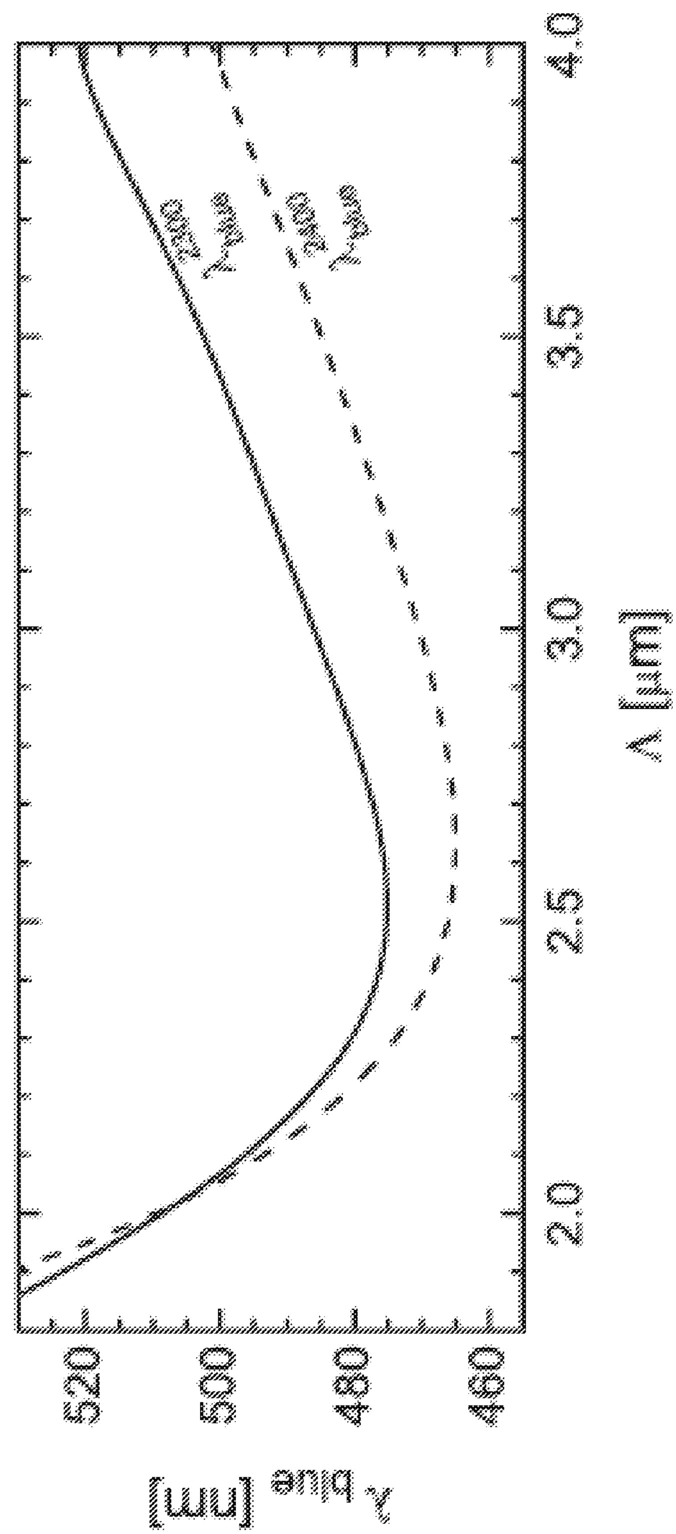
FIG. 2 shows the blue edge wavelength as a function of pitch for group-velocity matching to a loss edge of 2300 nm or 2400 nm.
Figure 3:
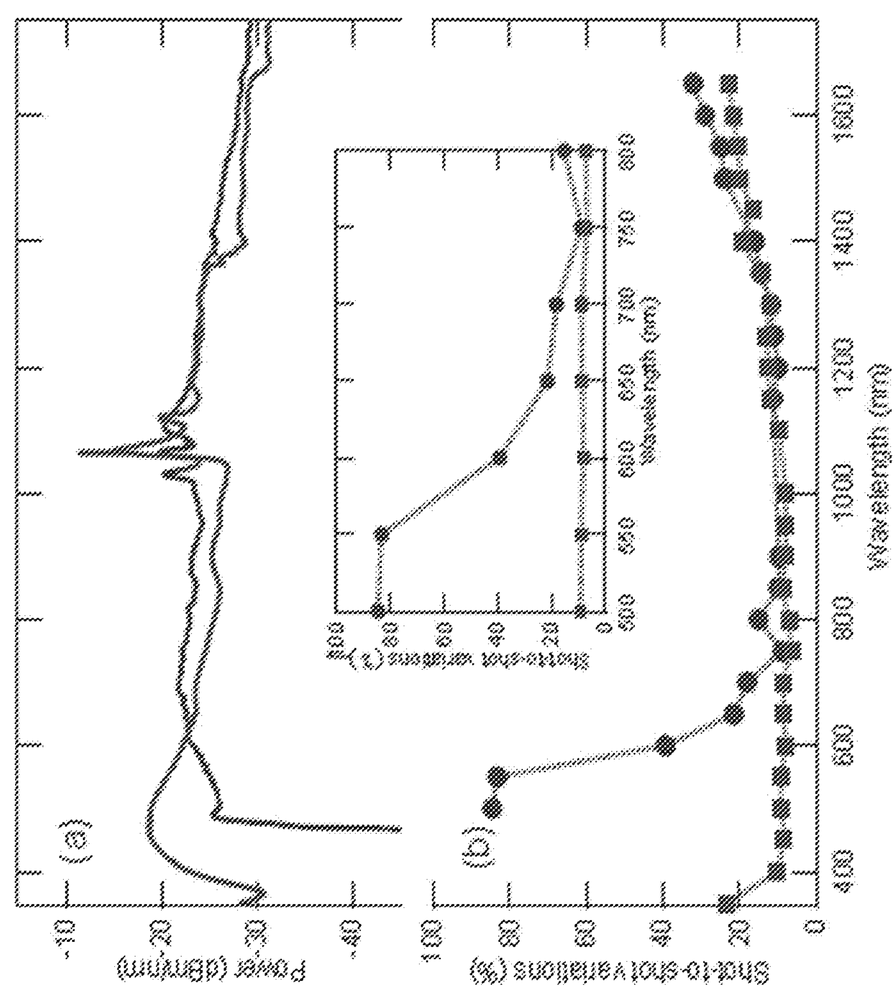
FIG. 3 shows power and noise as a function of the wavelength of a supercontinuum spectrum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been described in the foregoing, but it should be stressed that the invention is not limited to these, but may be embodied in other ways within the subject-matter defined in the following claims.

Figure 4A:
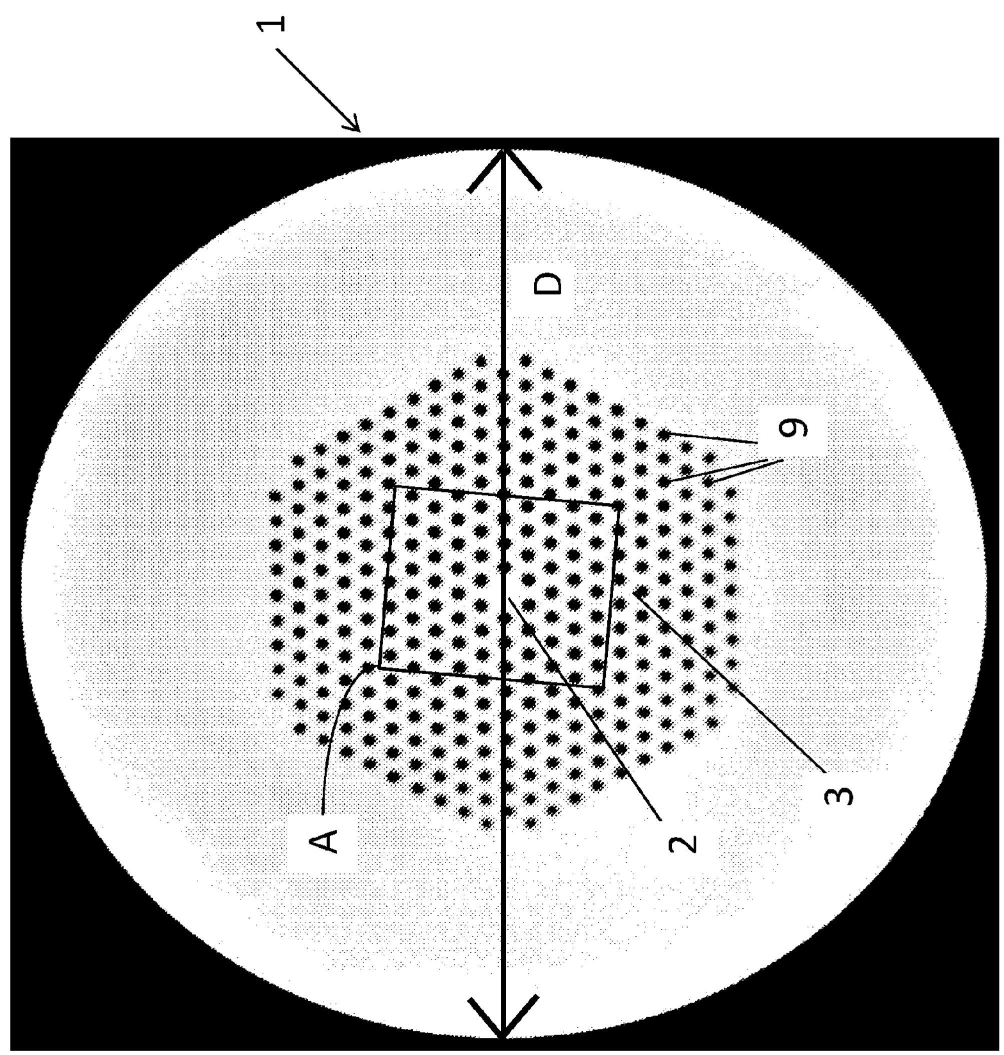
FIG. 4*a* shows a picture of a cross-section of a microstructured fiber, perpendicular to the longitudinal axis.

FIG. 4*a* shows a picture of a cross-section of a microstructured fiber 50, perpendicular to the longitudinal axis. The fiber is a microstructured fiber comprising a core region 52 and a cladding region 53, the cladding region surrounding the core region. The cladding region comprises an inner cladding background or base material in which microstructure elements 59 in the form of low-index cladding features are provided. The microstructure elements 59 shown are features in the form of holes or voids extending in the longitudinal direction of the fiber, and an. The core region 52 comprises a refractive index profile such that the core region comprises material with a refractive index score being different from the refractive index of a material in the inner cladding region. In order to tune various properties of the optical fiber it may be preferred to have a special refractive index profile of the core region. The region A denotes an area of the fiber to be shown enlarged in FIG. 4*b*.

Figure 4B:
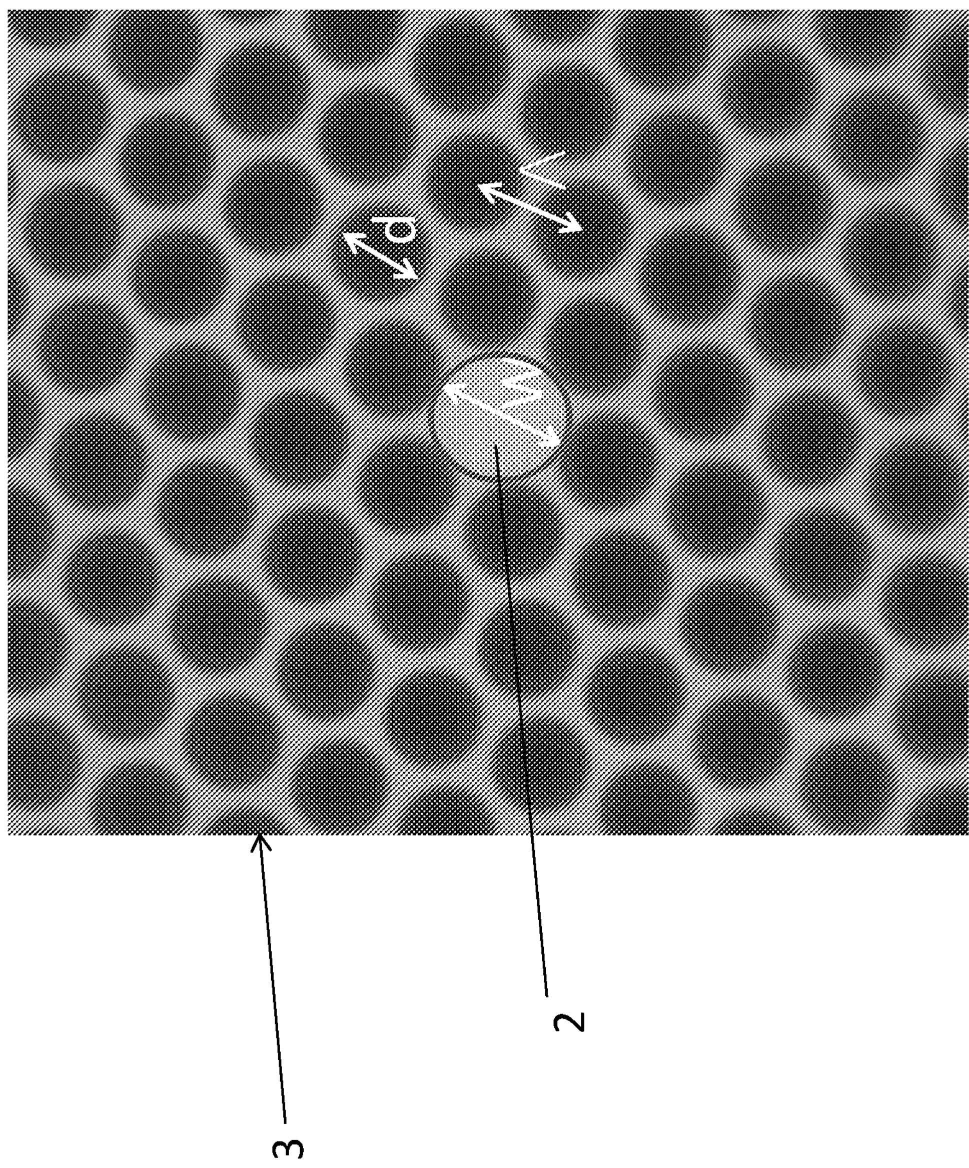
FIG. 4*b* shows part of a cross-section of a microstructured fiber, perpendicular to the longitudinal axis.

FIG. 4*b* shows part of a cross-section of a microstructured fiber, perpendicular to the longitudinal axis, corresponding to an enlargement of the square region denoted A in FIG. 4*a*. In FIG. 4*b* is shown the core area or core region 52 as defined as the area of a circle inscribed by the microstructure elements of the cladding arranged to immediately surround the core 52. The circle has characteristic core diameter W being the diameter of the largest circle that may be inscribed within the core without interfering with any microstructure elements or cladding features of the fiber, in a cross-section through the fiber perpendicularly to the longitudinal axis thereof. The cladding comprises a microstructure with a plurality of microstructure elements or cladding features each having a microstructure element diameter $d_f$. The microstructure elements are arranged at a pitch Λ, where the pitch Λ is a measure of the spacing between the microstructure elements. As shown in FIG. 4*b* the pitch A is indicated as the distance between the centers of two adjacent microstructure elements.

Figure 5:
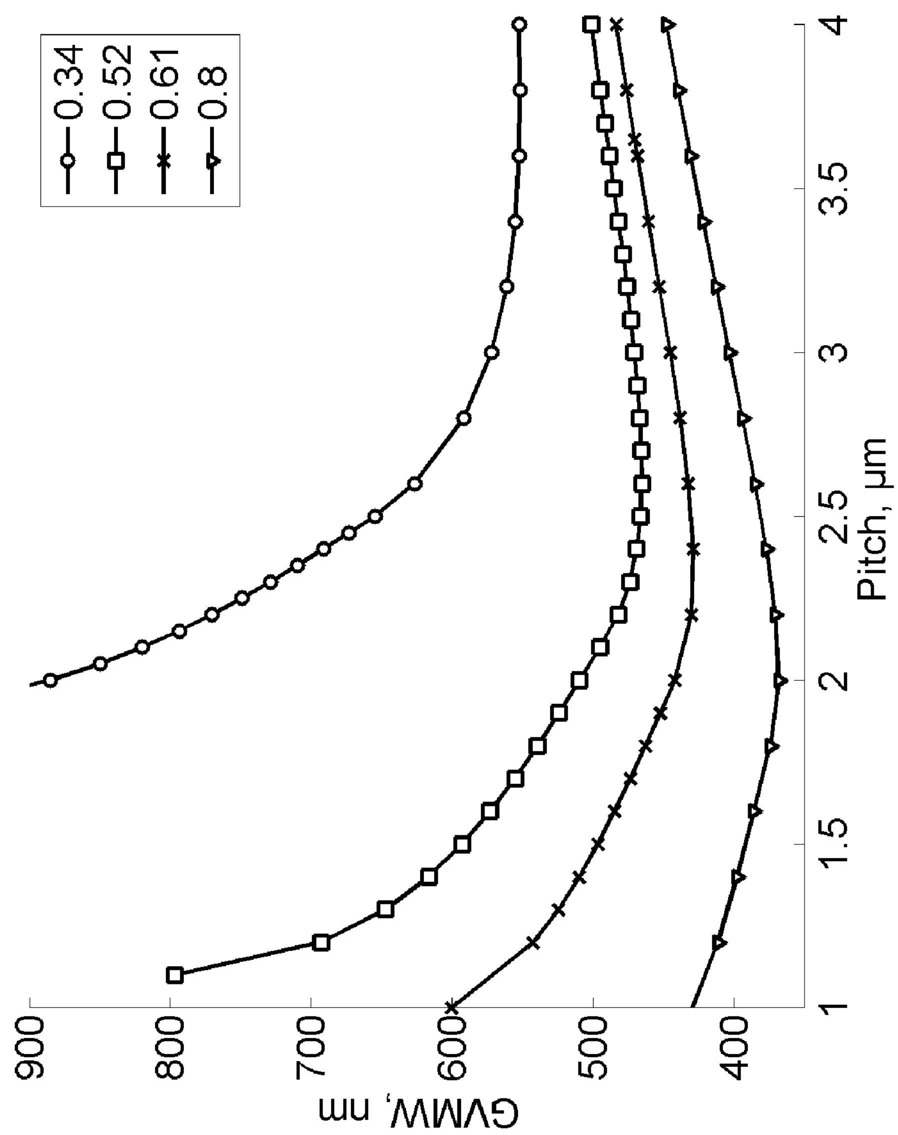
FIG. 5 shows the group velocity matched wavelength corresponding to the second zero dispersion wavelength as a function of pitch for four fibers with relative size of microstructure elements of 0.34, 0.52, 0.61 and 0.8.

FIG. 5 shows the group velocity matched wavelength corresponding to the second zero dispersion as a function of pitch for four fibers with relative size d/Λ of microstructure elements of 0.34, 0.52, 0.61 and 0.8. In prior art it has been shown that a tapered fiber with very large relative hole size, viz. a very large relative size of microstructure elements, can be used to obtain supercontinuum extending down to very short wavelengths. This is exemplified by the curve of an optical fiber with relative size d/Λ of 0.8 (not a part of the present invention). The curve shows a minimum GVMW of around 360 nm for a pitch Λ=2.0 μm, which is in agreement with the prior findings of the above referenced articles by Kudlinksi, Travers and Møller. As it can be seen in FIG. 5 the blue edge pitch is the pitch where the curve has a minimum. Decreasing the relative size of microstructure elements provides a decrease in minimum GVMW. For a relative size of microstructure elements d/Λ=0.61, the minimum GVMW is 430 nm and is obtained at a pitch Λ=2.4 μm. It is noticed that for a relative size of microstructure elements d/Λ=0.61, the GVMW is below 500 nm for all pitches between 1.5 and 4.0 μm. Hence if a fiber with d/Λ=0.61 is tapered down whilst keeping the relative size of microstructure elements constant, then the GVMW will be below 500 nm for all cross sections in the taper. Thus, in an example a tapered fiber with a relative size of microstructure elements of around d/Λ=0.61 can lead to a supercontinuum having a broad wavelength peak below 500 nm, as will be further explained in relation to FIG. 18.

In an embodiment of the invention an incoherent supercontinuum source having low noise from 680 nm to 920 nm is obtained. In this embodiment the second section of the fiber has a group velocity matched wavelength $GVMW_2$ in the range from about 650 nm to 800 nm. For a relative size of microstructure elements of d/Λ=0.52, FIG. 5 shows that this requires the pitch to be Λ<1.5 μm. A tapered fiber having a constant relative size microstructure elements of d/Λ=0.52 is further described in relation to FIGS. 7 to 12. If the relative size of microstructure elements is d/Λ=0.34, the requirement on the pitch changes to be Λ<2.5 μm, corresponding to a mode field diameter of around 3.5 μm at 1064 nm. This enables low loss splicing to a standard supercontinuum fiber as e.g. SC-3.7-975 from NKT Photonics as will be further described below in relation to FIGS. 13 to 17.

Figure 6A:
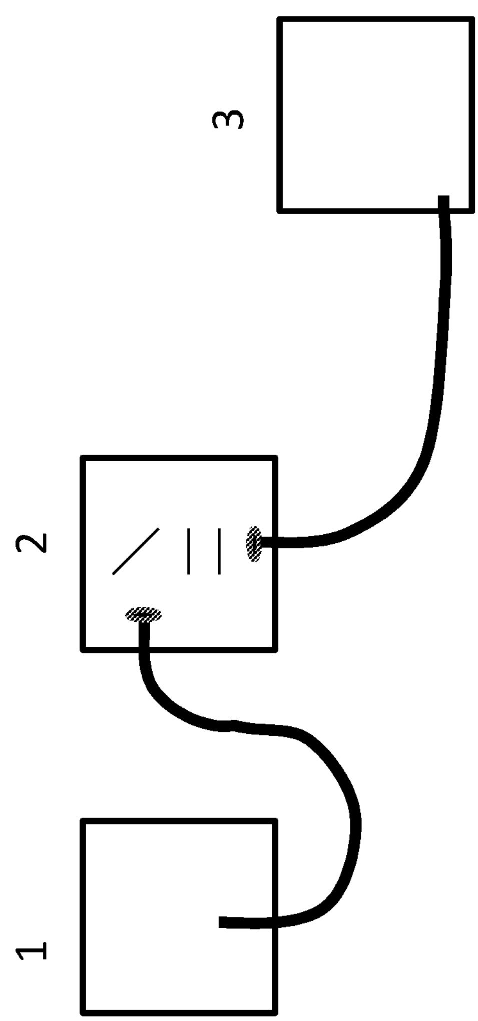
FIGS. 6*a* and 6*b* show systems for narrow band and wide band spectral noise measurement, respectively.
Figure 6B:
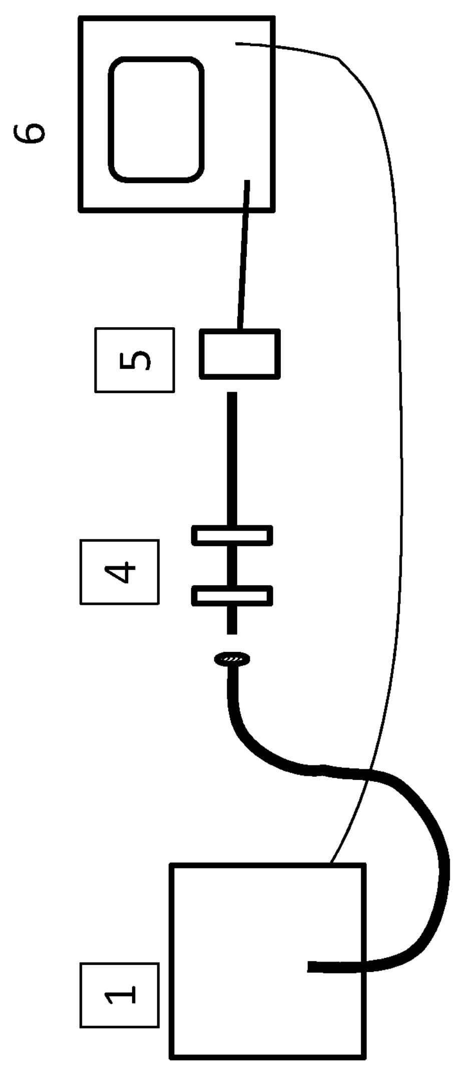

FIGS. 6*a* and 6*b* show systems for narrow band and wide band spectral noise measurement, respectively.

The noise of an optical spectrum may be measured in a number of different ways depending on the frequency range and spectral resolution. The applications requiring low spectral noise are typically divided into two categories: narrow spectral resolution of 0.1 nm or less, which is typically required for applications such as spectral domain optical coherence tomography, and large spectral resolution of 10 nm or more for applications where the detailed spectral information is not required.

The actual noise performance is quite different for the two ranges of spectral resolution, and two different methods have therefore been applied to characterize the noise, viz. a narrow band spectral noise measurement (illustrated in FIG. 6*a*) and a broad band spectral noise measurement (illustrated in FIG. 6*b*).

FIG. 6*a* shows a system for narrow band spectral noise measurement (<0.1 nm). For the narrow band spectral noise characterization a high resolution, high speed spectrometer is used to perform the measurements. The system shown in FIG. 6*a* comprises a light source 1 under investigation, a single-mode coupling unit 2, and a high resolution spectrometer 3 or narrow band spectrometer. The spectrometer 3 includes a high speed line camera for fast acquisition of the spectral data (typical line rates are between 10 and 140 kHz, with 1024 to 8096 pixels per spectrum). The coupling unit 2 includes means of signal power attenuation and band pass filtering that is matched to the spectral range of the spectrometer 3 in order to avoid ghosting effects. The spectrometer 3 is adjusted to a specific integration time and line scan rate. The photons from the light source 1 are detected on the camera for the duration specified by the integration time and are subsequently read out. For a pulsed source this means that the number of pulses collected per spectrum is determined by the integration time multiplied by the pulse frequency of the source (e.g. 10 ρs×80 MHz=800 pulses), and the measured spectrum is the sum of these pulses.

The spectral noise is in the context of this text defined as the relative standard deviation of the individual spectral bin (i.e. defined by the spectral resolution) over time. The standard deviation is calculated over a number of spectra—typically the spectrometer reads out a number of spectra (e.g. 500 or 1000) in a frame. As the result is a statistical value, it may be relevant to perform a number of such measurements to get a value with sufficiently high confidence.

The spectral noise can be measured as a function of wavelength (which may be relevant if this is wavelength dependent) or as an average value across the spectrum.

If the spectrometer noise (e.g. thermal noise, circuit noise or shot-noise) is comparable to the noise of the light source 1 at low spectrometer readings, this can have a significant impact on the measurement result, where the measured noise decreases as the power increases. In such a case it may be necessary to perform measurements at different input power levels by stepwise changing the attenuation from the light source to the spectrometer in order to ensure that the weaker parts of the spectrum are not significantly influenced by the spectrometer noise (similar to high dynamic range imaging).

FIG. 6*b* shows a system for broad band or wide band spectral noise measurements (>10 nm).

For wide band spectral noise characterization of a pulsed light source 1, the relative standard deviation of the individual pulse energy is measured in the relevant spectral width.

The measurement system comprises a light source 1 under investigation, an attenuation and wide band spectral filtering unit 4, a fast optical detector 5, and a high speed digital oscilloscope 6. The electrical bandwidth of the detector and the oscilloscope must be much larger that the frequency of the light source to avoid crosstalk from one pulse to the next.

For pulses with durations much shorter than the response time of the electronic detection system, the detected pulse amplitude will be proportional to the energy of the detected pulse. Hence, to evaluate the statistics of the pulse energy it is sufficient to measure the statistics of the amplitudes of the detected signals. This may be performed by using internal oscilloscope analysis functions which determine the peak amplitude of each pulse over a certain measurement ensemble (typical 1000 individual pulse traces) and calculate the average and standard deviation of this parameter.

The measurement is repeated at different source power levels to determine the power dependence of the noise and using band pass filters with different center wavelengths to determine the wavelength dependence.

FIG. 7*a* shows a schematic drawing of an embodiment of a microstructured optical fiber 10 according to the invention, and FIGS. 7*b* and 7*c* show cross-sections of the microstructured fiber, perpendicular to the longitudinal axis, at a first and second fiber length section, respectively. The microstructured optical fiber is arranged for generating supercontinuum light upon feeding of light having a first wavelength $\lambda_1$ from about 900 nm to about 1100 nm, such as between 1000 nm and 1100 nm, for instance 1064 nm. The optical fiber 10 has a length and a longitudinal axis along its length and comprises a core region for guiding light along the length of the optical fiber, and a first cladding region surrounding the core region.

The optical fiber 10, along its length, comprises a first fiber length section 12, a second fiber length section 14 as well as a tapered section 13 between the first and second fiber length sections 12, 14. The optical fiber 10 optionally includes an end cap 8. The extension of the end cap length 8 in the longitudinal axis of the fiber 10 is of a magnitude of 100 μm, e.g. 200 μm, whilst the total length of microstructured fiber is e.g. several meters, for example 10 meters or 50 meter.

In an embodiment the sum of the first and second lengths of the microstructured fiber 10 is such as less than about 50 m, such as less than about 30 m, such as less than about 20 m, such as less than 10 m. In an embodiment, the second length $L_2$ is larger than about 1 m, such as larger than about 3 m, such as larger than about 5 m, such as larger than about 10 m.

FIG. 7*b* shows a cross-section of the microstructured fiber, perpendicular to the longitudinal axis, at the first length section 12. As it can be seen the microstructure elements are arranged in a hexagonal pattern in the cladding. It is indicated that the first fiber length section 12 has a core region with a first characteristic core diameter $W_1$ and a cladding region with a first pitch $\Lambda_1$, a first microstructure diameter $d_1$ and a first relative size of microstructure elements $\Lambda_1/d_1$ in a cross-section through the fiber perpendicularly to the longitudinal axis. The second fiber length section 14 has a core region with a second characteristic core diameter $W_2$ and a cladding region with a second pitch $\Lambda_2$, a second microstructure diameter $d_2$ and a second relative size of microstructure elements $\Lambda_2/d_2$ in a cross-section through the fiber perpendicularly to the longitudinal axis. The second pitch $\Lambda_2$ is chosen so as to be smaller than the blue edge pitch $\Lambda_{pitch}$. The first pitch $\Lambda_1$ is larger than the second pitch $\Lambda_2$. The first relative size of microstructure elements $\Lambda_1/d_1$ is about 0.75 or less, such as about 0.65 or less, such as about 0.55 or less. The second relative size of microstructure elements $\Lambda_2/d_2$ is equal to or less than the first relative size of microstructure elements $\Lambda_1/d_1$.

The tapered section 13 of the optical fiber 10 comprises a core region and cladding, which is tapered from parameters of the first section to the parameters of the second section over a length $L_{t1}$ of the tapered section The length $L_{t1}$ of the tapered section is at least about 0.1 m, such as least about 0.2 m, such as at least about 0.5 m, such as at least about 1 m, such as at least about 1.5 m, such as at least 2 m, such as at least 5 m, such as at least 10 m.

It may be seen from FIG. 7*a* that the tapering from the first fiber length section to the second fiber length section means a substantially monotonic decrease of the dimensions of the fiber from the first length section 12 to the second length section 14. In the first length section 12 the dimensions of the fiber, viz. the core diameter, the first pitch, the first microstructure diameter, the first relative size of microstructure elements, are substantially constant, and in the second length section 14 the second characteristic core diameter $W_2$, the second pitch, the second microstructure diameter, and the second relative size of microstructured elements are substantially constant. In the tapering section, whilst the microstructure pitch and microstructure element diameter vary along at least a part of the intermediate length section 13 of the fiber 10. In an embodiment, the relative size of microstructure elements is be constant throughout the fiber, such that the first relative size of microstructure elements is substantially equal to the second relative size of the microstructure elements. However, in an alternative embodiment, the relative size of microstructure element varies in the tapered section, so that the first relative size of microstructure elements is different from the second relative size of the microstructure elements.

FIGS. 8 to 19 shows results from measurements where a non-linear microstructured optical fiber is pumped by a pulsed laser source. The noise of the output from a uniform fiber is compared with the output from a tapered fibre and with a cascaded fiber, viz. a fiber where two different microstructured optical fibers have been spliced together.

In the measurements, a pump laser source was 1064 nm and the temporal duration of the pump pulses just prior to the microstructured optical fiber was 8 ps. The bandwidth of the laser pulses was 10 nm. The output power from the pump source was adjustable with the maximum power being 10 W. The maximum output power will be referred to as 100% of the maximum power, whilst a power of e.g. 5 W will be referred to as 50% of the maximum power. The output of the pulsed laser source was spliced to the input of the microstructured optical fiber being measured.

The reference fiber for the measurements was a straight, uniform section of the commercial fiber SC-3.7-975 from NKT Photonics. The pitch was 2.6 μm and the relative hole size (d/Λ) was 0.52. The length of the reference fiber was 10 m. This fiber is used in NKT Photonics product series SuperK™ EXW (currently comprising the following variants: EXW-1, EXW-4, EXW-6 and EXW-12). The EXW fiber used as a reference fiber in the context of this application is the one denoted SC-3.7-975.

Figure 8:
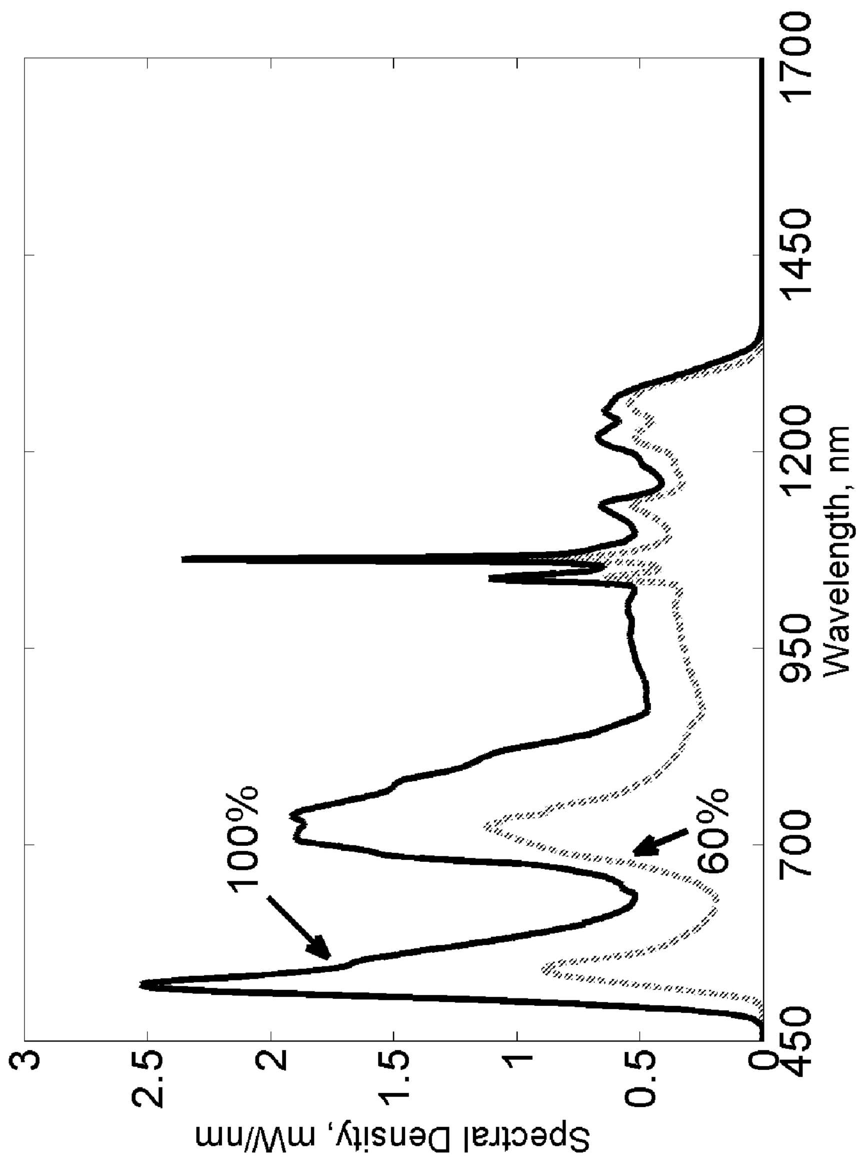
FIG. 8 shows supercontinuum spectra obtained from an embodiment of a microstructured optical fiber according to the invention, comprising a tapered section.

FIG. 8 shows supercontinuum spectra obtained from a microstructured optical fiber 10 according to the invention comprising a tapered section. The optical fiber 10 is an optical fiber as the one shown in FIG. 7*a*. In an alternative embodiment, the optical fiber 10 does not include an end cap.

The optical fiber 10 comprises a first uniform section 12 which is followed by a tapered section 13, where the tapered section 13 is followed by a second uniform section 14. The dimensions of the second uniform section 14 are smaller than those of the first uniform section 12. The second uniform section following the tapered section is also referred to as the waist of the taper.

EXAMPLE 1

As one example the dimensions of the first section includes a first length $L_1$=1 m, a first pitch $\Lambda_1$=2.6 μm and a first relative size of microstructure elements $d/\Lambda_1$=0.52. In Example 1, the microstructure elements are holes, and the term “relative size of microstructure elements” is thus seen as equivalent to “relative hole size”.

The tapered section 13 of the optical fiber 10 has a length $L_{t1}$=5 m, and the dimensions of the second section 14 includes a second length $L_2$=30 m, a second pitch $\Lambda_2$=1.3 μm and a second relative hole size $d_2/\Lambda_2$=0.52. The second section has a first zero dispersion wavelength $ZDW_{21}$=850 nm, a second zero dispersion wavelength $ZDW_{22}$=1167 nm and a group velocity match wavelength $GVM_2$=721 nm.

FIG. 8 shows supercontinuum spectra measured from the output of the optical fiber with the above dimensions. The supercontinuum spectra are shown for powers of the pump light source of 60% and 100%. FIG. 8 shows that the spectrum extends from about 450 nm to about 1300 nm for both powers of pump light source.

Figure 9:
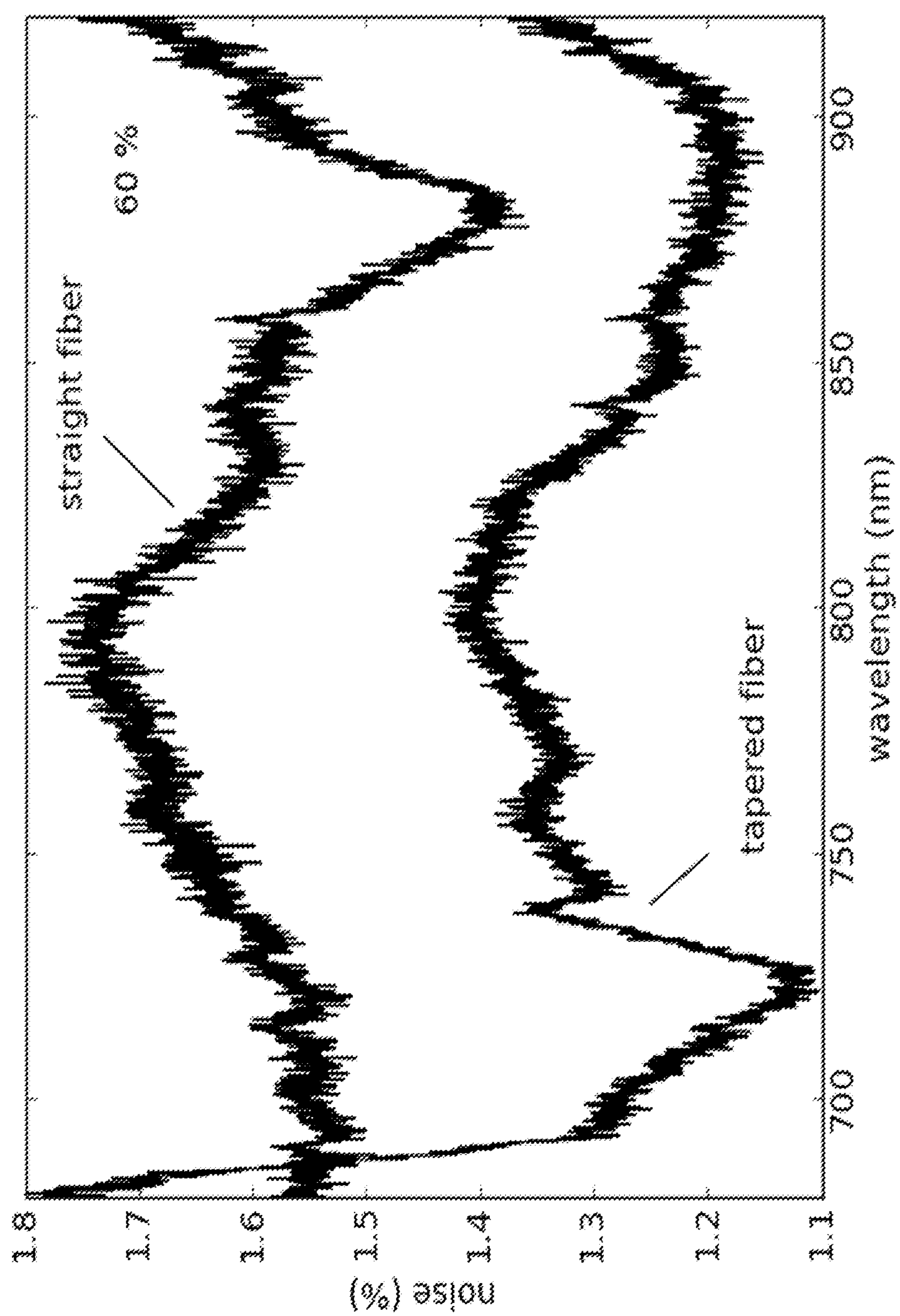
FIGS. 9 and 10 show noise spectra as a function of wavelength for an embodiment of an optical fiber according to the invention as compared to a uniform fiber.
Figure 10:
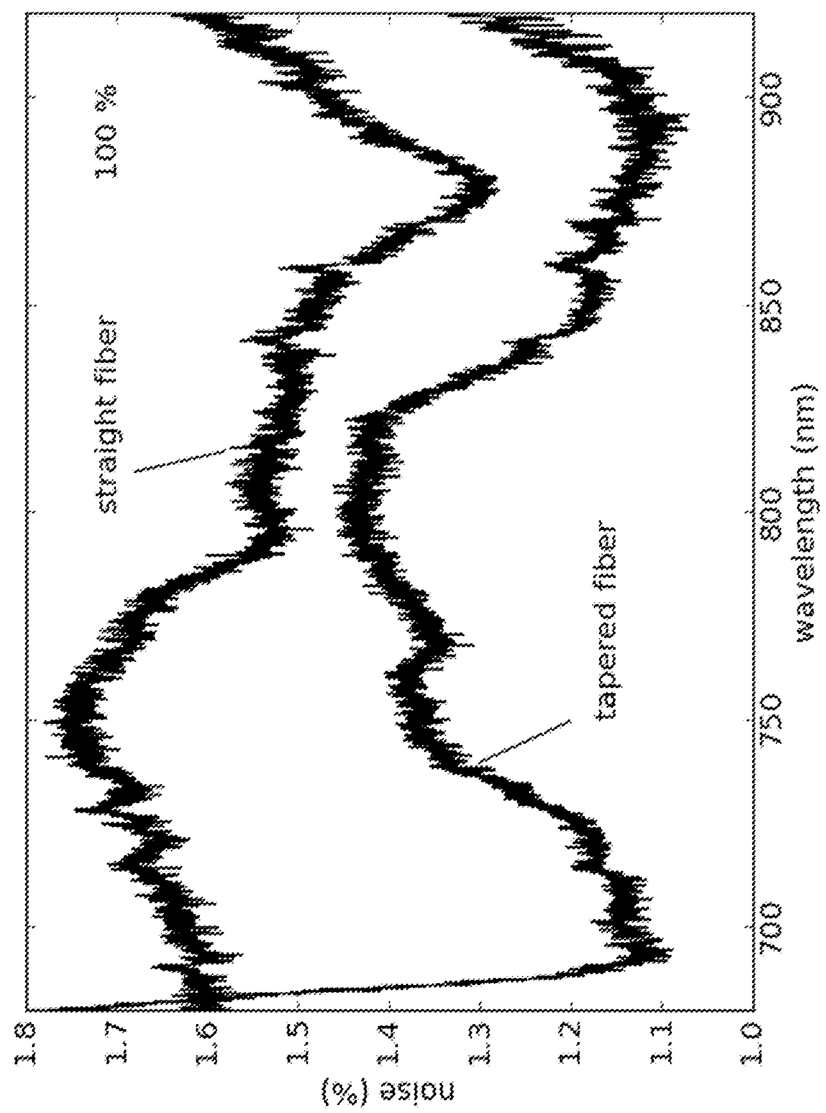

FIGS. 9 and 10 show narrow band noise spectra as a function of wavelength for an optical fiber having the dimensions as indicated in Example 1 (“tapered fiber”), as compared to a uniform fiber (“straight fiber”). FIG. 9 shows the noise spectrum as a function of wavelength for an optical power of the pump light source of 60%, whilst FIG. 10 shows the noise spectrum as a function of wavelength for an optical power of the pump light source of 100%. The noise spectra of FIGS. 9 and 10 are taken from the same tapered optical fiber according to an embodiment of the invention as well as from the same uniform fiber used as a reference.

The narrow bandwidth noise spectra shown in FIGS. 9 and 10 were measured with a diode array spectrometer with higher resolution, as previously described. In the wavelength range from 680-920 nm, FIGS. 9 and 10 shows a reduction in noise for an embodiment of the microstructured tapered optical fiber of the invention compared to the uniform reference fiber. Only for the smallest wavelengths, the noise is higher for the tapered fiber 10 compared to the uniform reference fiber.

Figure 11:
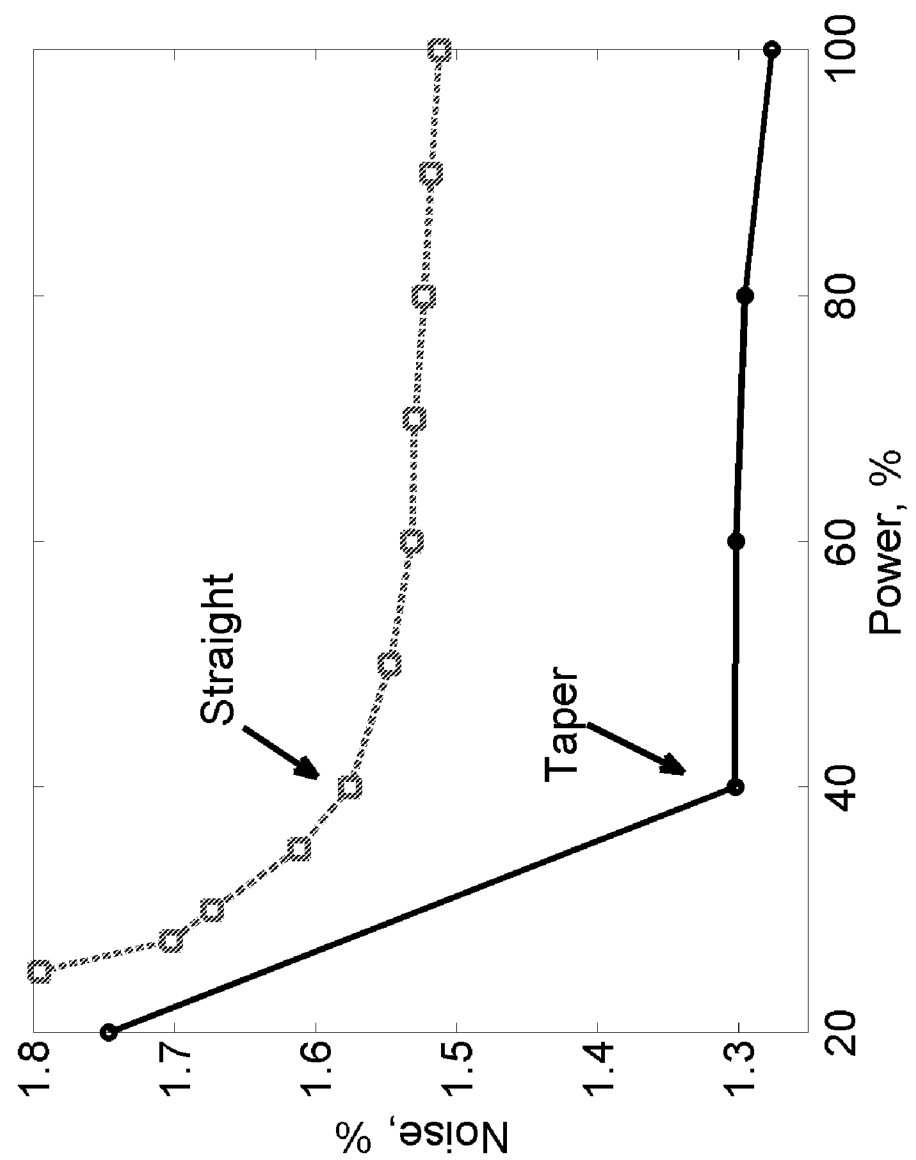
FIG. 11 shows a graph of the average noise for amplification levels between 20% and 100% of an incoherent supercontinuum source comprising an embodiment of an optical fiber according to the invention, as well as for a prior art optical fiber.

FIG. 11 shows a graph of the average noise for amplification levels between 20% and 100% of an incoherent supercontinuum source comprising an embodiment of an optical fiber according to the invention as well as for a prior art optical fiber. In FIG. 11, a comparison of noise for tapered fiber according to Example 1 and the uniform reference fiber. In the two cases the noise is compared at identical pump power. For a given amplification level, the average noise is obtained by averaging the noise in the wavelength range from 680 to 920 nm. Thus, the graphs of FIG. 9, corresponding to the noise in the wavelength range from 680 to 920 nm result in one point in the graph of FIG. 11 for the tapered fiber and another point in the graph of FIG. 11 for the uniform reference fiber. FIG. 11 shows that the average noise in this wavelength range from 680 to 920 nm is lower for the tapered fiber according to the invention compared to the uniform reference fiber. This is observed for all power levels between 20% and 100%.

Furthermore, a cut-back experiment was performed where the length of the second length was gradually reduced from 30 m. It was observed that the spectrum and noise between 680 and 920 nm were nearly independent of the length of the second section. However, when the tapered section was cut-off directly at the waist, meaning that the length of the second section is neglectable, the noise showed a small increase of a couple of percent compared to the previous level.

Figure 12:
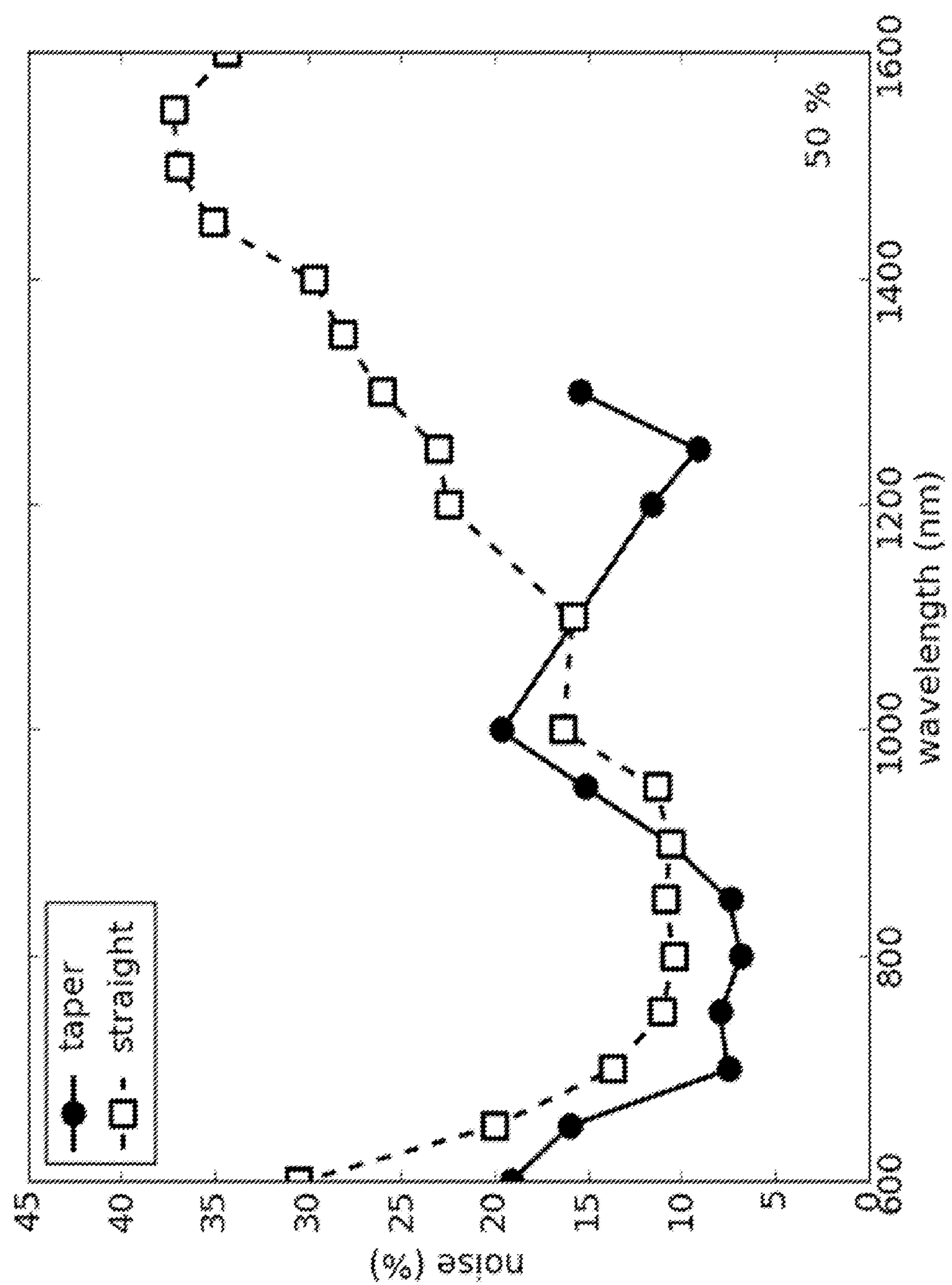
FIG. 12 shows broad band noise spectra as a function of wavelength for an embodiment of a tapered optical fiber according to the invention and from a uniform fiber.

FIG. 12 shows broad band noise spectra as a function of wavelength for an embodiment of a tapered optical fiber according to the invention and from a uniform referenced fiber.

The broad band noise spectra were measured with a photo detector and band pass filters, as previously described in relation to FIG. 6*b*. FIG. 12 shows the comparison of the broad bandwidth noise for the uniform reference fiber and the tapered fiber of Example 1. In the two cases, the noise has been measured at identical pump power. The results are shown for a 50% power level. The results for both the tapered fiber of Example 1 and the uniform reference fiber show that the noise is rapidly decreasing from 600 to 700 nm. At wavelengths longer than 700 nm the noise reaches a more or less constant level until approximately 900 nm. The tapered fiber of Example 1 has lower noise than the uniform reference fiber in the entire range from 600 nm to 900 nm. It is noticed that in contrast to what has been described in the article "Control of pulse-to-pulse fluctuations in visible supercontinuum", by Kudlinski et al, the tapered optical fiber of the invention, viz. of Example 1, decreases the noise in region from about 700 to 900 nm as compared to the uniform reference fiber. From around 900 to 1100 nm the noise in the taper is larger than in the uniform reference fiber, but from 1100 nm to 1300 nm the noise is again lower in the taper. Above 1300 nm there is no power in the output from the tapered fiber which is also evident from FIG. 8 of the spectrum from the tapered fiber of Example 1. Therefore, the noise cannot be measured at wavelengths above 1300 nm.

FIGS. 13*a*, 13*b* and 13*c* show an embodiment of a cascaded optical fiber 30 according to the invention and cross-sections through a first and second section thereof, perpendicular to the longitudinal axis, at a first and second fiber length section, respectively. The microstructured optical fiber 30 is arranged for generating supercontinuum light upon feeding of light having a first wavelength $\Lambda_1$ from about 900 nm to about 1100 nm, such as between 1000 nm and 1100 nm, for instance 1064 nm. The optical fiber 30 has a length and a longitudinal axis along its length and comprises a core region for guiding light along the length of the optical fiber, and a first cladding region surrounding the core region.

The optical fiber 30, along its length, comprises a first section 31, a second section 32 and a splicing 33 between the first and second sections 32, 33. The optical fiber 30 may optionally include an end cap 8 (not shown in FIG. 13*a*).

In an embodiment the sum of the first and second lengths of the microstructured fiber 10 is such as less than about 50 m, such as less than about 30 m, such as less than about 20 m, such as less than 10 m.

FIG. 13*b* shows a cross-section of the microstructured fiber, perpendicular to the longitudinal axis, at the first section 31. It is seen that the first section 31 has a core region with a first characteristic core diameter $W_1$ and a cladding region with a first pitch $\Lambda_1$, a first microstructure diameter $d_1$ and a first relative size of microstructure elements $\Lambda_1/d_1$ in a cross-section through the first section 31 perpendicularly to the longitudinal axis.

FIG. 13*c* shows a cross-section of the microstructured fiber, perpendicular to the longitudinal axis, at the second section 32. The second section 32 has a core region with a second characteristic core diameter $W_2$ and a cladding region with a second pitch $\Lambda_2$, a second microstructure diameter $d_2$ and a second relative size of microstructure elements $\Lambda_2/d_2$ in a cross-section through the fiber perpendicularly to the longitudinal axis.

Throughout the first section 31 the dimensions of the fiber, viz. the core diameter, the first pitch, the first microstructure diameter, the first relative size of microstructure elements, are substantially constant, and throughout the second section 32 the second characteristic core diameter $W_2$, the second pitch, the second microstructure diameter, and the second relative size of microstructured elements are substantially constant.

In an embodiment the first relative size $d_1/\Lambda_1$ of the microstructure elements is larger than the second relative size of the microstructure elements $d_2/\Lambda_2$, such as being about 1.2 times the second relative size $d_2/\Lambda_2$ of the microstructure elements or larger, such as about 1.3 times the second relative size $d_2/\Lambda_2$ of the microstructure elements or larger, such as about 1.4 times the second relative size $d_2/\Lambda_2$ of the microstructure elements or larger, such as about 1.5 times the second relative size $d_2/\Lambda_2$ of the microstructure elements. It is advantageous that the first relative size $d_1/\Lambda_1$ of the microstructure elements is larger than the second relative size of the microstructure elements $d_2/\Lambda_2$, in that this will reduce the splicing loss between the first section and the second section of the fiber compared to a situation where a first section and a second section having equal or similar relative size of microstructure elements were spliced together.

It has been shown that for a tapered fiber with a relative size $d/\Lambda$ of microstructure elements of 0.52 in both the first and second section, the lowest noise was obtained when the fiber was tapered down so that the second section had a second pitch $\Lambda_2$ of around 1.3 μm.

A fiber with a second section having a second pitch $\Lambda_2$ of around 1.3 μm has a simulated effective area of 3 μm at 1064 nm.

Table 1 below shows the relative size of microstructure elements $d/\Lambda$, the pitch $\Lambda$, the calculated mode field area and the calculated mode field diameter for a uniform reference fiber SC-3.7-975, a down-tapered part of an optical fiber, viz. the second section of a tapered optical fiber according to an embodiment of the invention, as well as the second section of a cascaded fiber according to an embodiment of the invention.

From Table 1 it is seen that the a second section of a tapered fiber having a relative size of microstructure elements of 0.5 being close to the relative size of microstructure elements in the uniform reference fiber, has an effective mode field area close to one third of the mode field diameter of the uniform reference fiber. The calculated minimum splice loss between such a tapered fiber and the reference fiber with Λ=2.6 μm and (d/Λ)=0.52 is 1.6 dB. This large splice loss will lead to local heating of the fiber, which decreases the power handling capability and life time of the splice.

The calculated minimum splice loss between the reference fiber and the cascaded fiber having the parameters of Table 1 is 0.1 dB. Therefore, it is advantageous that the relative size of microstructure elements in the second section of an embodiment of a cascaded fiber according to the invention is smaller than the relative size of microstructure elements in the first section.

TABLE 1

| Fiber | d/Λ | Λ (μm) | Aeff (μm$^2$) | MFD (μm) |
|---|---|---|---|---|
| SC-3.7-975 | 0.52 | 2.6 | 8.5 | 3.3 |
| Taper waist | 0.5 | 1.3 | 3 | 2 |
| Cascade | 0.34 | 2.2 | 10.5 | 3.6 |

In an embodiment, the second pitch $\Lambda_2$ of the second section is at about 2 μm or larger, such as at about 2.3 μm or larger, such as at about 2.6 μm or larger, such as at about 3 μm or larger.

In an embodiment the first length $L_1$ is in the range from about 1 m to about 5 m or less, such as in the range from about 2 m to about 4 m.

EXAMPLE 2

Example 2 is an example of an embodiment of the invention providing lowered noise. Example 2 is a cascaded fiber 30, which is a combination of a first section 31 of a uniform microstructured fiber and a second section 32 of a microstructured optical fiber spliced together at the splicing 33. Originally, the first section 31 of the cascaded fiber 30 was 10 meter of uniform fiber for supercontinuum generation. Throughout the measurements on the fiber of Example 2, the first section was shortened, as described in relation to FIG. 14, in order to compare the influence of the length of the first section on the noise. The first pitch $\Lambda_1$ was 2.6 μm and first relative hole size $d_1/\Lambda_1$ was 0.52.

The second section 32 was a microstructured optical fiber with a second pitch $\Lambda_2$ of 2.2 μm, a second relative hole size $d_2/\Lambda_2$ of 0.36 and a length of 10 m. The second section had a second zero dispersion wavelength $ZDW_{22}$=1800 nm and group velocity match wavelength $GVM_2$=770 nm. A simulation using the Gaussian radius approximate shows that the first section has an effective mode area of 10.5 μm at 1064 nm, whereas the second section has an effective mode area of 8 μm. Using the standard formula for the coupling loss between Gaussian modes, this gives a minimum obtainable loss of 0.1 dB. In practice a splicing loss of 0.5 dB was obtained.

Table 2 below indicates the parameters of the first and second section of the cascade optical fiber of Example 2.

TABLE 2

| | First section (~SC-3.7-975) | Second section (NL-1060-1800) |
|---|---|---|
| d/Λ | 0.5 | 0.36 |
| Λ | 2.45 μm | 2.2 μm |
| ZDW | ~965 nm | 1060 nm |
| ZDW2 | >2800 nm | 1800 nm |

Figure 14:
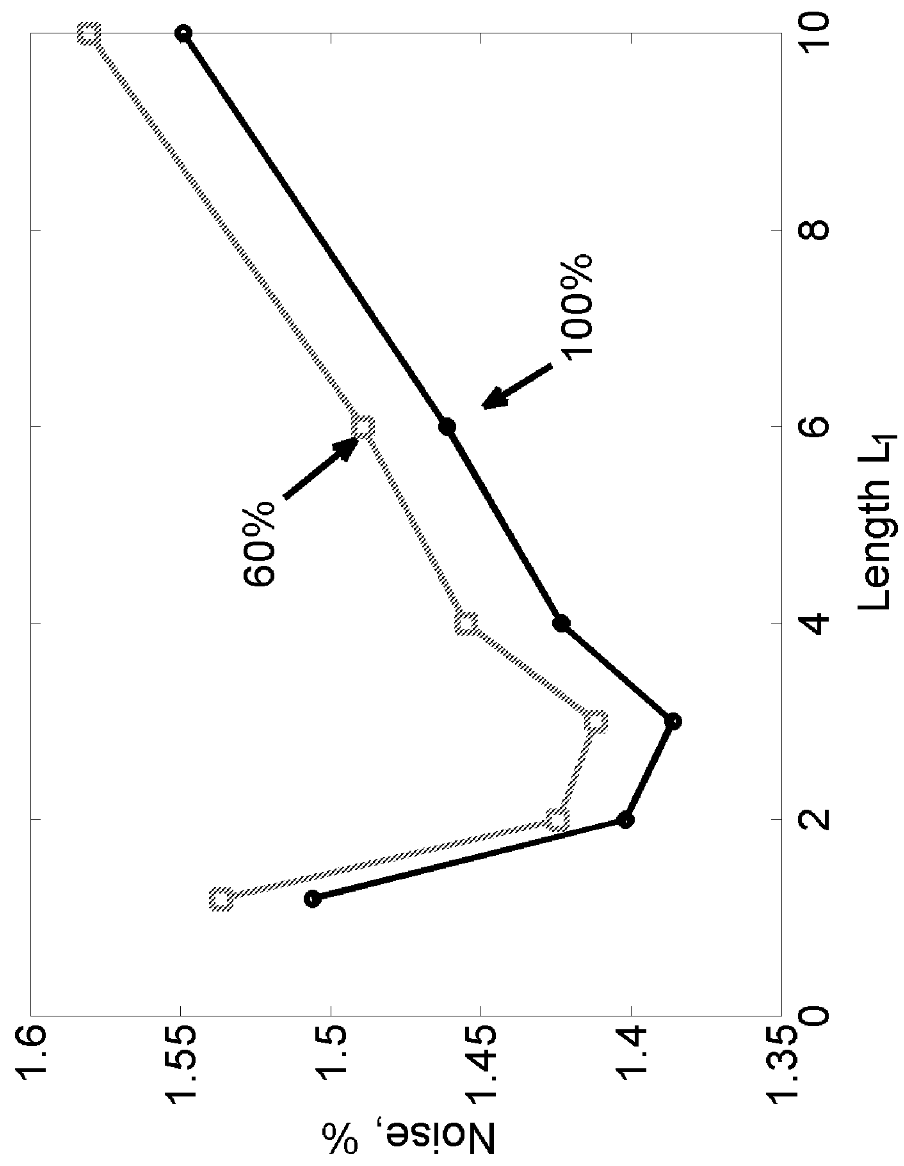
FIG. 14 shows graphs of the noise of a cascaded optical fiber for different lengths of the first section.

FIG. 14 shows graphs of the noise of an embodiment of a cascade optical fiber according to Example 2 for different lengths of the first section. The length of the first section of the cascaded fiber was gradually reduced from 10 m and the spectrum and noise were measured for lengths of 10 m, 6 m, 5 m, 4 m, 3 m, 2 m and finally 1 m. It was seen that for this particular choice of fibers, the minimum noise is obtained for a length $L_1$ of the first section of about 3 m.

Figure 15:
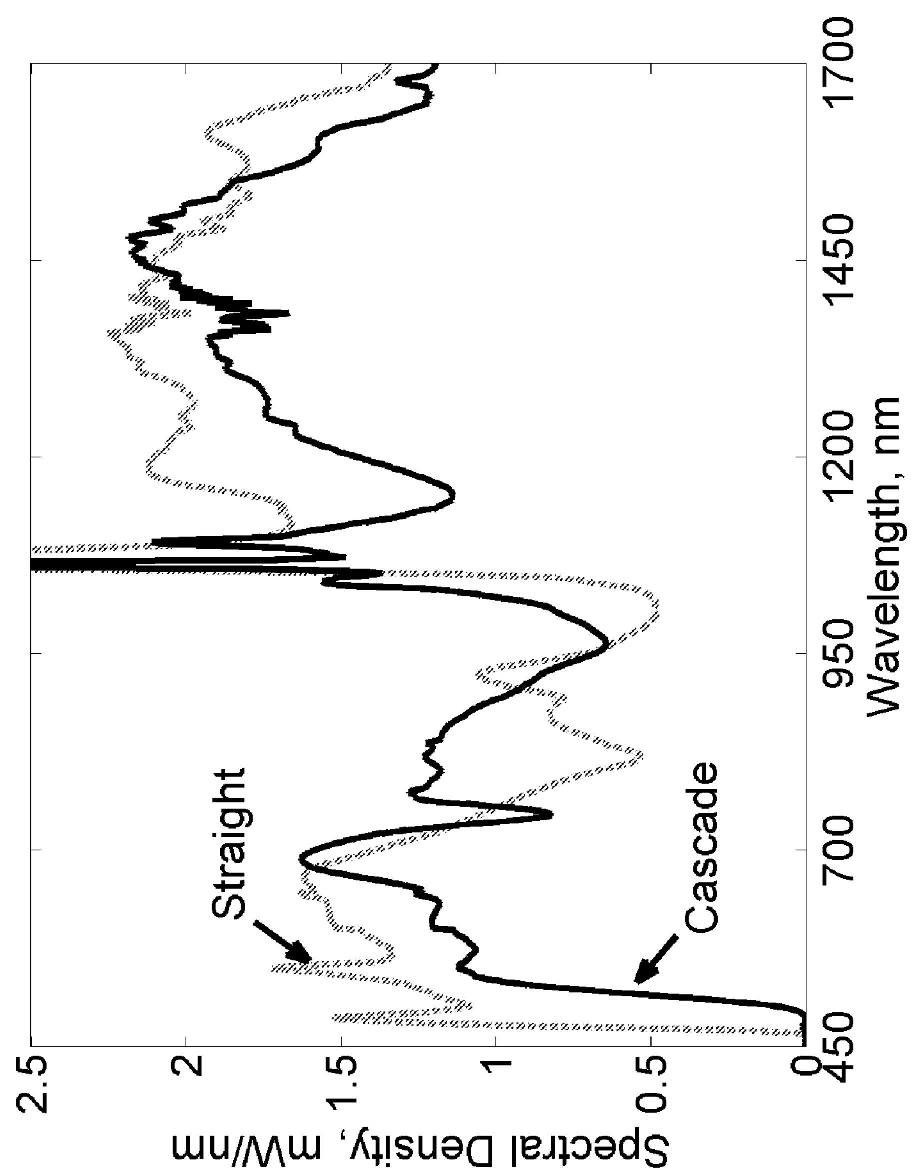
FIG. 15 shows supercontinuum spectra obtained from another embodiment of a microstructured optical fiber according to the invention, comprising a cascade, and from a uniform fiber.

FIG. 15 shows supercontinuum spectra obtained from the microstructured optical fiber of Example 2 and from a uniform reference fiber. The reference fiber for the measurements was again a uniform section of fiber. The pitch was 2.6 μm and the relative hole size (d/Λ) was 0.52. The length of the reference fiber was 10 m. This fiber is used in NKT Photonics product series SuperK EXW FIG. 15 shows noise spectra as a function of wavelength for an embodiment of a cascaded optical fiber of Example 2 as compared to a uniform reference fiber as indicated above. In the wavelength range from 750 to 920 nm, a reduction in noise is observed for the optical fiber of the invention, viz. in accordance with Example 2, compared to the uniform reference fiber. For wavelengths shorter than 750 nm, the noise in the output from the cascaded fiber of Example 2 is slightly higher than the uniform reference fiber. However, the average noise in the recorded wavelength interval is lower for the cascaded fiber, as it is clear from FIG. 17.

Figure 16:
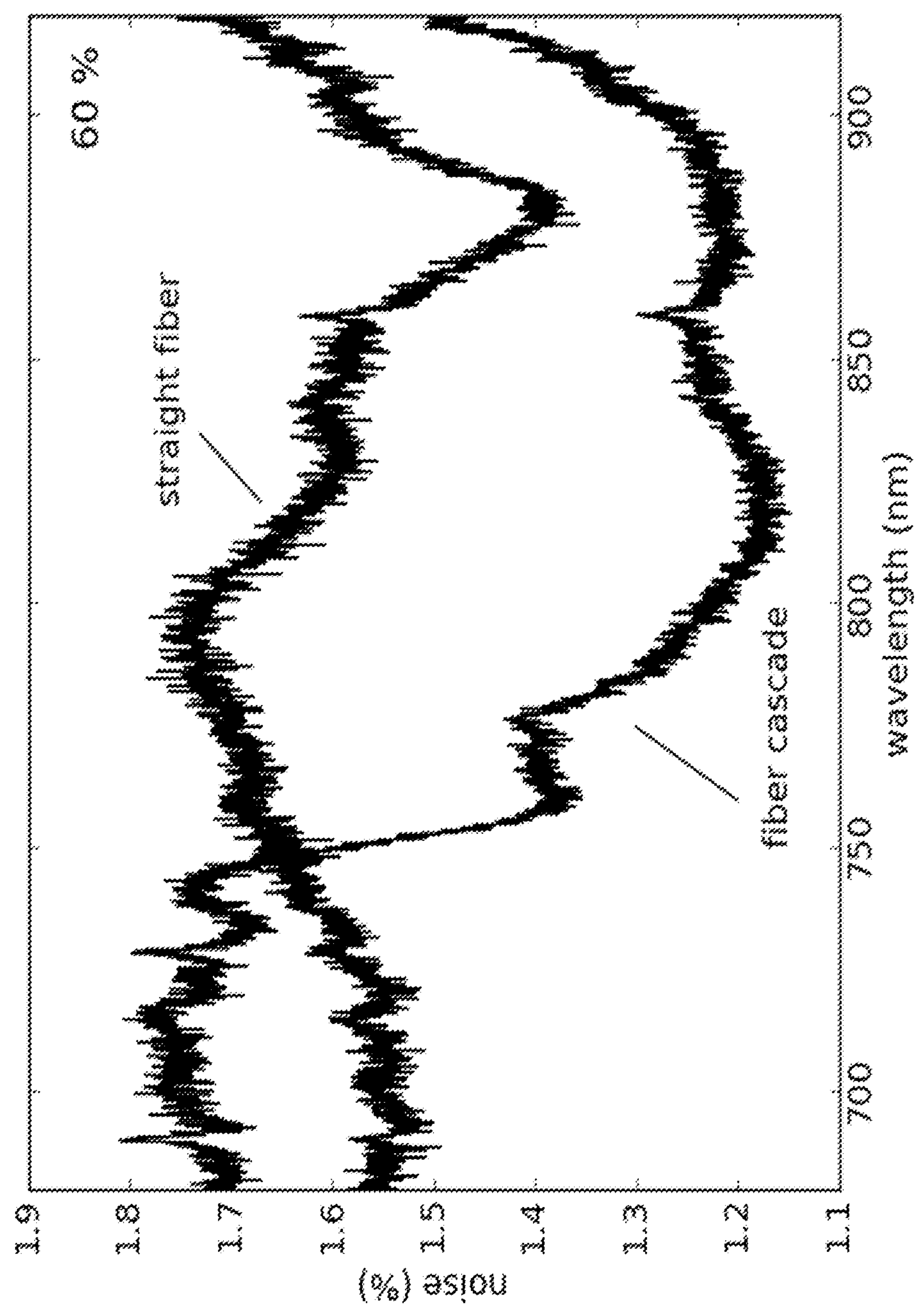
FIG. 16 shows noise spectra as a function of wavelength for an embodiment of a cascaded optical fiber according to the invention as compared to a uniform fiber.

FIG. 16 shows narrow bandwidth noise spectra as a function of wavelength for a cascaded optical fiber according to an embodiment of the invention as compared to a uniform fiber. The noise spectra of FIG. 16 are obtained for an amplification level of 60% for both the cascaded optical fiber according to an embodiment of the invention and for the reference fiber.

Figure 17:
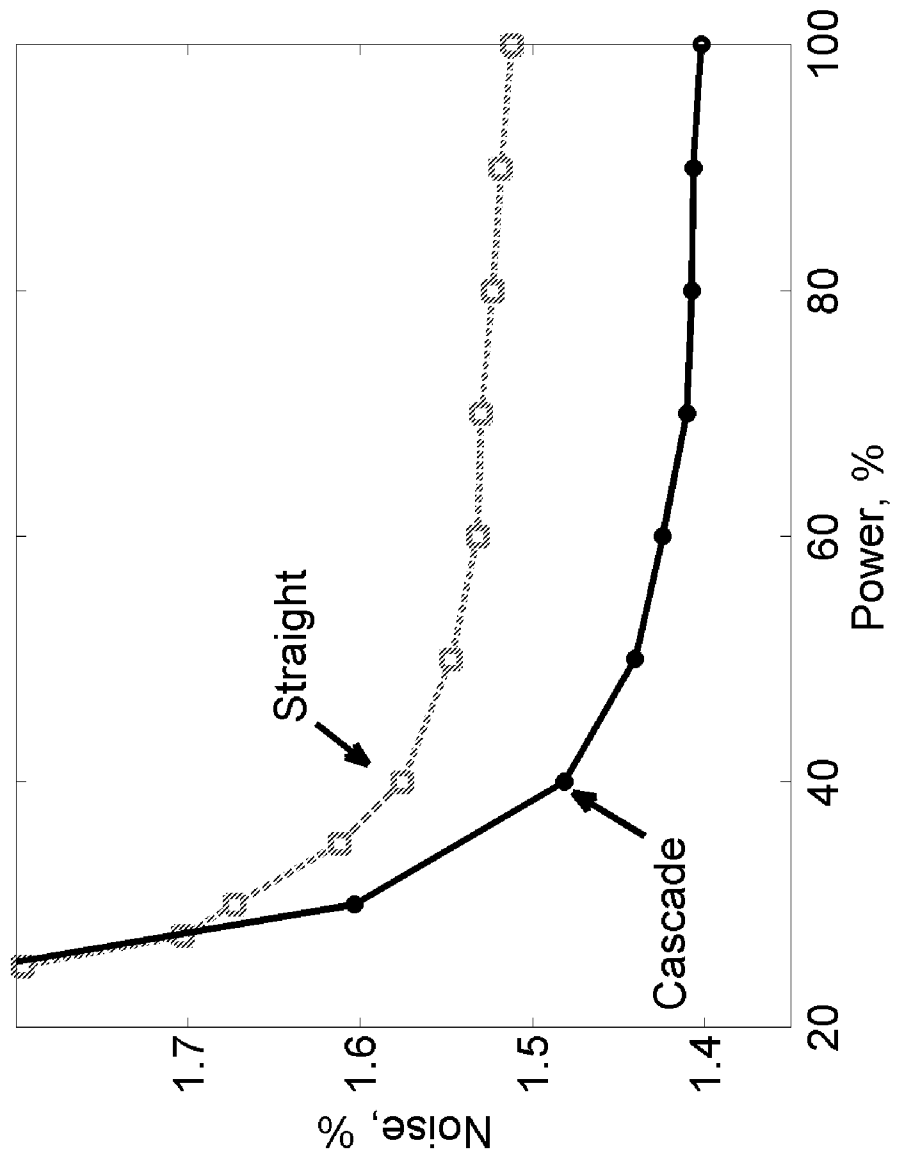
FIG. 17 shows a noise spectrum for amplification levels between 20% and 100% of an incoherent supercontinuum source comprising an embodiment of a cascaded optical fiber according to the invention as well as for a prior art optical fiber.

FIG. 17 shows a noise spectrum for amplification levels between 20% and 100% of an incoherent supercontinuum source comprising an embodiment of a cascaded optical fiber according to the invention, as well as for a prior art optical fiber.

In FIG. 17, a comparison of noise for tapered fiber according to Example 2 and the uniform reference fiber. In the two cases the noise is compared at identical pump power. For a given amplification level, the average noise is obtained by averaging the noise in the wavelength range from 680 to 920 nm. Thus, the graphs of FIG. 16, corresponding to the noise in the wavelength range from 680 to 920 nm result in one point in the graph of FIG. 16 for the cascaded fiber of Example 2 and another point in the graph of FIG. 16 for the uniform reference fiber. FIG. 17 shows that the average noise in this wavelength range from 680 to 920 nm is lower for the tapered fiber according to the invention compared to a uniform fiber for all power levels between 30% and 100%.

Figure 18:
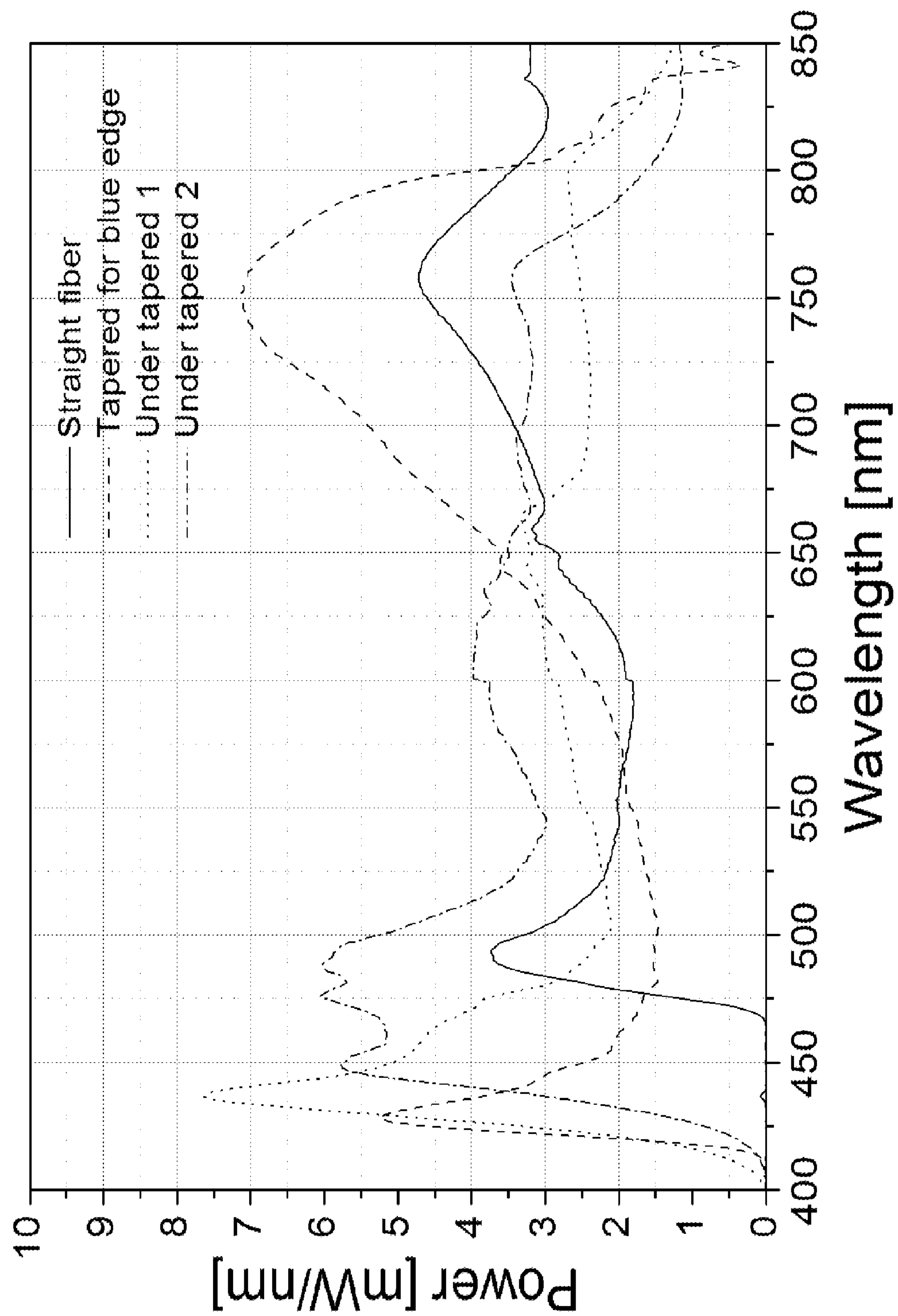
FIG. 18 shows supercontinuum spectra obtained by four different optical fibers.

FIG. 18 shows supercontinuum spectra obtained by four different optical fibers, two prior art optical fibers and two embodiments of optical fibers according to the invention.

The solid curve (“Straight fiber”) shows the spectrum from a straight, uniform prior art fiber with a pitch of Λ=3.65 μm.

The dashed curve ("Tapered for blue edge") shows the spectrum from a fiber tapered to the blue edge, viz. a fiber tapered in order to obtain the maximum blue shift. This fiber has been tapered from a pitch $\Lambda$=3.65 μm to a pitch $\Lambda$=2.4 μm.

The dotted curve ("Under tapered 1") shows the spectrum obtained from an embodiment of a tapered fiber according to the invention. This fiber has been tapered to a pitch smaller than the blue edge pitch. This fiber has been tapered from a pitch $\Lambda$=3.65 μm to a pitch $\Lambda$=1.65 μm. Thus, the fiber corresponding to the dotted curve has been tapered to a smaller pitch than the fiber tapered down to the blue edge pitch, corresponding to the dashed curve.

The dash-dotted curve ("Under tapered 2") shows the spectrum obtained from an embodiment of another tapered fiber according to the invention. This fiber has been tapered from a pitch of $\Lambda$=3.65 μm to a pitch of $\Lambda$=1.50 μm. Thus, the fiber corresponding to the dash-dotted curve has been tapered to an even smaller pitch than the fiber corresponding to the dotted curve.

Figure 19:
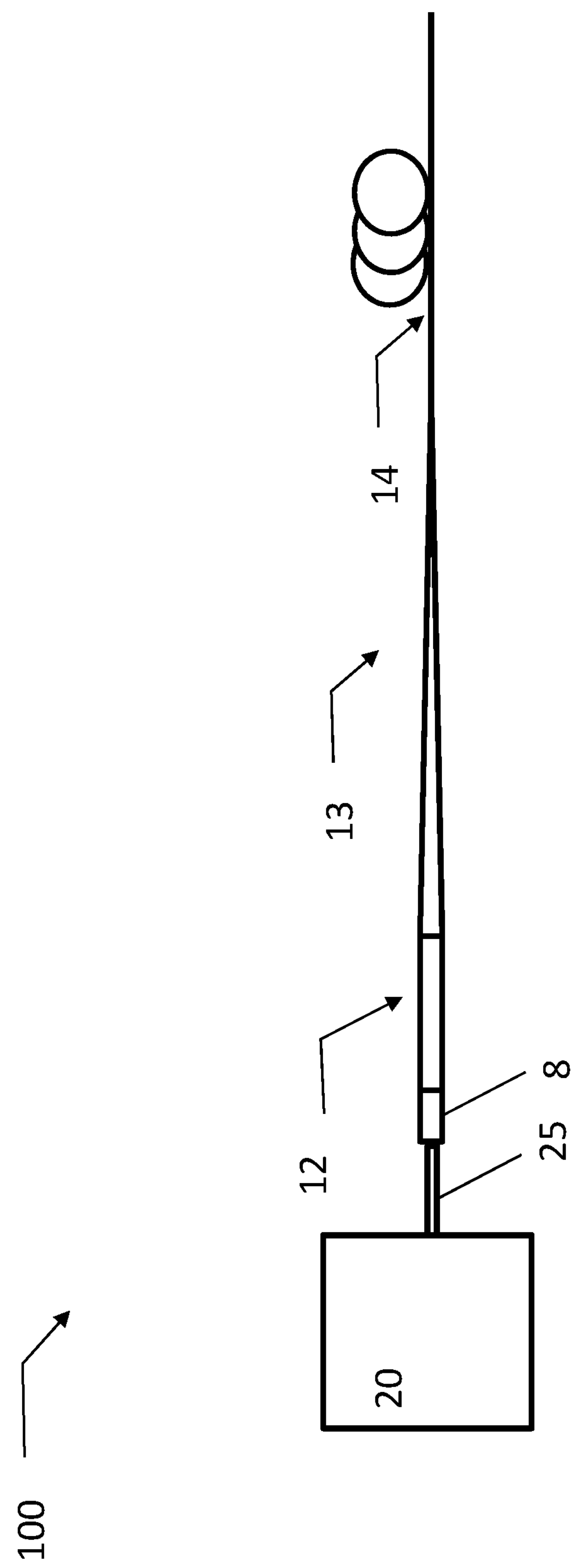
FIG. 19 is a schematic drawing of a supercontinuum light source comprising a microstructured optical fiber and a pump light source.

From FIG. 18 it is clear that undertapering shifts the blue edge of the spectrum towards shorter wavelengths. Moreover, FIG. 19 show that the spectrum from the fiber denoted "Under tapered 2" has a relatively high power at wavelengths between about 430 nm and about 780 nm. In the range from about 430 nm to about 520 nm, the power is about 5 nW/nm or higher. The spectrum from the fiber denoted "Under tapered 1" has a quite high power, at or above 4 nW/nm, at wavelengths between about 430 nm and 475 nm.

FIG. 19 is a schematic drawing of a supercontinuum light source 100 comprising a microstructured optical fiber 10 and a pump light source 20.

FIG. 19 shows that the microstructured optical fiber 10 is a tapered fiber; however, the supercontinuum light source is not limited to sources with tapered fibers. Instead, a cascaded fiber could be the optical fiber of the supercontinuum light source.

The pump light source 20 has an output 25 arranged to feed light into the end cap 8 of the microstructured optical fiber 10, adjacent to the first length section 12 of the optical fiber. The light fed into the end cap 8 of the optical fiber 10 continues to the intermediate length section 13 and the second length section 14. Due to the large size of the core of the fiber in the first length section 12, a large amount of light may be fed into the fiber 10 without damaging it. The light is confined to the core region, and as the core region of the fiber is reduced throughout the intermediate length section, the intensity of the confined light increases. However, due to the relatively long intermediate length section 13, the transition of the light intensity from the first length section 12 to the second length section 14 takes place adiabatically.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

All features of the inventions including ranges and preferred ranges can be combined in various ways within the scope of the invention, unless there are specific reasons for not to combine such features.

Some embodiments have been shown in the foregoing, but it should be stressed that the invention is not limited to these, but may be embodied in other ways within the subject-matter defined in the following claims. Various modifications and applications may occur to those skilled in the art without departing from the true spirit and scope of the invention as defined in the appended claims.

The invention claimed is:

1. A microstructured optical fiber for generating incoherent supercontinuum light upon feeding of pump light, said microstructured optical fiber having a length and a longitudinal axis along its length and comprising, along its length, a core region that is capable of guiding light along the length of said microstructured optical fiber, and a first cladding region surrounding said core region, said first cladding region comprising a microstructure having a plurality of microstructure elements, wherein said microstructured optical fiber, along its length, comprises:

a first section with a first length $L_1$, wherein the microstructure elements of said optical fiber at least at a first cross-section through the first section perpendicularly to the longitudinal axis has a first pitch $\Lambda_1$, a first microstructure diameter $d_1$ and a first relative size $d_1/\Lambda_1$ of microstructure elements, wherein the microstructured optical fiber at least in said first cross-section has a first zero dispersion wavelength ZDW1$_1$ in the range from about 920 to about 1120 nm a second section with a second length $L_2$, wherein the microstructure elements of said optical fiber at least at a second cross-section through the second section perpendicularly to the longitudinal axis has a second pitch $\Lambda_2$, a second microstructure diameter $d_2$ and a second relative size $d_2/\Lambda_2$ of microstructure elements, wherein said microstructured optical fiber at least in said second cross-section through the microstructured optical fiber has a first zero dispersion wavelength ZDW2$_1$ and a second zero dispersion wavelength ZDW2$_2$, said second zero dispersion wavelength being about 2200 nm or shorter, wherein the sum of the first length $L_1$ and the second length $L_2$ is about 1 meter or larger.

2. A microstructured optical fiber according to claim 1, wherein said second pitch $\Lambda_2$ is smaller than a blue edge pitch $\Lambda_{blue}$, where said blue edge pitch $\Lambda_{blue}$ is defined as a specific pitch giving the shortest possible blue edge wavelength of the supercontinuum light for said second relative size $d_2/\Lambda_2$ of microstructure elements.

3. A microstructured optical fiber according to claim 1, wherein the relative size $d_1/\Lambda_1$ of microstructure elements in the first cross-section is about 0.75 or less.

4. A microstructured optical fiber according to claim 1, wherein said microstructured optical fiber in said second cross-section has a group velocity matched wavelength $GVMW_2$ in the range from about 650 nm to about 800 nm.

5. A microstructured optical fiber according to claim 1, wherein the second relative size $d_2/\Lambda_2$ of the microstructure elements is about 0.75 or less.

6. A microstructured optical fiber according to claim 1, wherein the second pitch $\Lambda_2$ is about 0.9 times the blue edge pitch $\Lambda_{blue}$ or smaller.

7. A microstructured optical fiber according to claim 1, wherein said first zero dispersion wavelength ZDW2$_1$ of said second cross-section is less than about 1000 nm, such as less than about 900 nm.

8. A microstructured optical fiber according to claim 7, wherein the second pitch $\Lambda_2$ is smaller than the first pitch $\Lambda_1$.

9. A microstructured optical fiber according to claim 7, where said second pitch $\Lambda_2$ is in the range from about 1.1 μm to about 1.7 μm.

10. A microstructured optical fiber according to claim 1, wherein the microstructured optical fiber further comprises a second tapered section $L_{t2}$ and a third section with third length $L_3$, wherein the microstructure elements of said optical fiber at least at a third cross-section through the third section perpendicularly to the longitudinal axis has a third pitch $\Lambda_3$, a third microstructure diameter $d_3$ and a third relative size $d_3/\Lambda_3$ of microstructure elements; wherein the third pitch $\Lambda_3$ is larger than the second pitch $\Lambda_2$.

11. A microstructured optical fiber according to claim 1, wherein a cross-section through the first tapered section perpendicularly to the longitudinal axis of the fiber comprises microstructures at a first taper pitch $\Lambda_{t1}$, a first taper microstructure diameter $d_{t1}$ and a first taper relative size $d_{t1}/\Lambda_{t1}$ of microstructure elements, wherein the first taper section of the microstructured optical fiber has a taper group velocity matched wavelength $GVMW_{t1}$ corresponding to a second zero dispersion wavelength $ZDW_{t1}$ in said cross-section, where said taper group velocity matched wavelength $GVMW_{t1}$ is in the range from about 400 nm to about 500 nm for any cross-sections of the first tapered section.

12. A microstructured optical fiber according to claim 1, wherein the first section is coupled to the second section by a splicing.

13. An incoherent supercontinuum source comprising:

i. a microstructured optical fiber for generating incoherent supercontinuum light upon feeding of pump light, said microstructured optical fiber having a length and a longitudinal axis along its length and comprising, along its length, a core region that is capable of guiding light along the length of the microstructured optical fiber, and a first cladding region surrounding said core region, said first cladding region comprising a microstructure having a plurality of microstructure elements, ii. a pump source with a center wavelength between about 1000 nm and about 1100 nm and a pulse length of longer than about 500 fs, wherein said microstructured optical fiber, along its length, comprises:

a first section with a first length $L_1$, wherein the microstructure elements of said optical fiber at least at a first cross-section through the first section perpendicularly to the longitudinal axis has a first pitch $\Lambda_1$, a first microstructure diameter $d_1$ and a first relative size $d_1/\Lambda_1$ of microstructure elements, wherein said microstructured optical fiber at least in said first cross-section has a first zero dispersion wavelength $ZDW\mathbf{1}_1$ in the range from about 920 to about 1120 nm;

a second section with a second length $L_2$, wherein the microstructure elements of said optical fiber at least at a second cross-section through the second section perpendicularly to the longitudinal axis has a second pitch $\Lambda_2$, a second microstructure diameter $d_2$ and a second relative size $d_2/\Lambda_2$ of microstructure elements, wherein said microstructured optical fiber at least in said second cross-section through the microstructured optical fiber has a first zero dispersion wavelength $ZDW\mathbf{2}_1$ and a second zero dispersion wavelength $ZDW\mathbf{2}_2$, said second zero dispersion wavelength being about 2200 nm or shorter, wherein the sum of the first length $L_1$ and the second length $L_2$ is about 1 meter or larger.

14. An incoherent supercontinuum source according to claim 13, wherein the second pitch $\Lambda_2$ is smaller than a blue edge pitch $\Lambda_{blue}$, wherein said blue edge pitch $\Lambda_{blue}$ is defined as a specific pitch giving the shortest possible blue edge wavelength of the supercontinuum light for said second relative size $d_2/\Lambda_2$ of microstructure elements.

15. An incoherent supercontinuum source according to claim 13, said microstructured optical fiber further comprising a first tapered section with length $L_{t1}$, wherein the tapered section connects the first section and the second section.

16. An incoherent supercontinuum source according to claim 13, wherein the first section is coupled to the second section by a splicing.

17. The incoherent supercontinuum source according to claim 13, wherein the pump source is a seed laser arranged to provide seed pulses with a seed pulse frequency $F_{seed}$, the supercontinuum source further comprising a pulse frequency multiplier (PFM) arranged to multiply the seed pulses and convert the seed pulse frequency $F_{seed}$ to pump pulses with a pump pulse frequency $F_{pump}$, where said pump pulse frequency $F_{pump}$, is larger than said seed pulse frequency $F_{seed}$.

18. The incoherent supercontinuum light source according to claim 13, said pump light source comprising a mode-locked laser and at least one amplifier, said supercontinuum light source having an output being spliced onto said input end of said microstructured optical fiber.

19. An optical coherence tomography (OCT) acquisition system comprising a supercontinuum light source according to claim 13, and a detector for collecting reflected light and an image processor for analyzing the detected reflected light.

20. An optical coherence tomography (OCT) acquisition system of claim 19 wherein the acquisition system is configured to determine a wavefront aberration in a coherent signal to thereby provide a wavefront sensor.

* * * * *